(12) United States Patent
Ravensbergen et al.

(10) Patent No.: US 11,846,867 B2
(45) Date of Patent: Dec. 19, 2023

(54) HOLLOW-CORE PHOTONIC CRYSTAL FIBER BASED BROADBAND RADIATION GENERATOR

(71) Applicant: ASML NETHERLANDS B.V., Veldhoven (NL)

(72) Inventors: Janneke Ravensbergen, Würzburg (DE); Patrick Sebastian Uebel, Marloffstein (DE); Willem Richard Pongers, Veldhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 17/539,347

(22) Filed: Dec. 1, 2021

(65) Prior Publication Data
US 2022/0187680 A1     Jun. 16, 2022

(30) Foreign Application Priority Data

Dec. 10, 2020  (EP) .................................. 20213013
Jun. 8, 2021   (EP) .................................. 21178292

(51) Int. Cl.
*G02F 1/35*     (2006.01)
*G02B 6/02*     (2006.01)
(Continued)

(52) U.S. Cl.
CPC ....... *G02F 1/3528* (2021.01); *G02B 6/02328* (2013.01); *G02F 1/365* (2013.01);
(Continued)

(58) Field of Classification Search
None
See application file for complete search history.

(56) References Cited

U.S. PATENT DOCUMENTS 4,946,250 A  *  8/1990  Gonthier ............ G02B 6/02052
                                                    385/27
5,708,740 A  *  1/1998  Cullen ............... G02B 6/02071
                                                    385/39
(Continued)

FOREIGN PATENT DOCUMENTS

CN      104795720       7/2015
CN      109313404       2/2019
(Continued)

OTHER PUBLICATIONS

European Search Report issued in corresponding European Patent Application No. 21208721, dated Apr. 13, 2022.
(Continued)

*Primary Examiner* — Rhonda S Peace
(74) *Attorney, Agent, or Firm* — Pillsbury Winthrop Shaw Pittman, LLP

(57) ABSTRACT

A broadband radiation source device configured for generating a broadband output radiation upon receiving pump radiation, the device including: a hollow-core photonic crystal fiber (HC-PCF) including at least one structurally varied portion having at least one structural parameter of the HC-PCF varied with respect to one or more main portions of the HC-PCF, wherein the at least one structurally varied portion includes at least a structurally varied portion located downstream of a position along the length of the HC-PCF where the pump radiation will be spectrally expanded by a modulation instability dominated nonlinear optical process, and wherein the at least one structurally varied portion is configured and located such that the broadband output radiation includes wavelengths in the ultraviolet region.

20 Claims, 12 Drawing Sheets

(51) Int. Cl.
*G02F 1/365* (2006.01)
*H01S 3/067* (2006.01)
*G06F 30/392* (2020.01)
*G06F 30/398* (2020.01)
*G03F 9/00* (2006.01)
*G06F 119/18* (2020.01)

(52) U.S. Cl.
CPC .......... *G03F 9/7034* (2013.01); *G06F 30/392* (2020.01); *G06F 30/398* (2020.01); *H01S 3/06741* (2013.01); *G06F 2119/18* (2020.01)

(56) References Cited

U.S. PATENT DOCUMENTS

| | | | |
|---|---|---|---|
| 6,952,253 B2 | 10/2005 | Lof et al. | |
| 6,961,116 B2 | 11/2005 | Den Boef et al. | |
| 7,265,364 B2 | 9/2007 | Teunissen | |
| 7,646,471 B2 | 1/2010 | Teunissen et al. | |
| 7,742,665 B2* | 6/2010 | Digonnet | G02B 6/02328 359/333 |
| 7,821,704 B1* | 10/2010 | Pepper | H01S 3/06708 359/344 |
| 8,068,705 B2* | 11/2011 | Gapontsev | H01S 3/06745 385/28 |
| 8,977,087 B2* | 3/2015 | Jacobsen | C03B 37/029 385/43 |
| 9,160,137 B1* | 10/2015 | Abdolvand | H01S 3/0092 |
| 9,841,557 B2* | 12/2017 | Johansen | H01S 3/094042 |
| 11,029,464 B2* | 6/2021 | Bauerschmidt | G02B 6/02328 |
| 11,163,208 B2* | 11/2021 | Uebel | G02F 1/353 |
| 2004/0015085 A1 | 1/2004 | Soh et al. | |
| 2005/0094941 A1* | 5/2005 | Knox | G02B 6/02028 385/27 |
| 2006/0159398 A1* | 7/2006 | Knox | G02B 6/02347 385/123 |
| 2007/0237453 A1* | 10/2007 | Nielsen | G02B 6/262 385/28 |
| 2007/0280304 A1* | 12/2007 | Deile | H01S 3/0975 372/6 |
| 2007/0296960 A1 | 12/2007 | Den Boef et al. | |
| 2008/0198380 A1 | 8/2008 | Straaijer et al. | |
| 2009/0032730 A1* | 2/2009 | Erickson | G02B 6/02347 250/435 |
| 2009/0052852 A1* | 2/2009 | Minkovich | G02B 6/02376 385/125 |
| 2009/0168062 A1 | 7/2009 | Straaijer | |
| 2009/0220186 A1* | 9/2009 | Jin | B29D 11/00663 385/11 |
| 2010/0007863 A1 | 1/2010 | Jordanoska | |
| 2010/0233600 A1 | 9/2010 | Den Boef et al. | |
| 2010/0328655 A1 | 12/2010 | Den Boef | |
| 2011/0026032 A1 | 2/2011 | Den Boef et al. | |
| 2011/0032500 A1 | 2/2011 | Straaijer | |
| 2011/0102753 A1 | 5/2011 | Van De Kerkhof et al. | |
| 2011/0102793 A1 | 5/2011 | Straaijer | |
| 2011/0188020 A1 | 8/2011 | Den Boef | |
| 2011/0249244 A1 | 10/2011 | Leewis et al. | |
| 2011/0267612 A1* | 11/2011 | Roberts | G02B 6/02328 385/124 |
| 2012/0044470 A1 | 2/2012 | Smilde et al. | |
| 2012/0044495 A1 | 2/2012 | Straaijer | |
| 2012/0127563 A1* | 5/2012 | Farmer | G02B 6/14 359/341.3 |
| 2013/0162996 A1 | 6/2013 | Straaijer et al. | |
| 2013/0182999 A1* | 7/2013 | Jacobsen | G02F 1/365 65/379 |
| 2013/0308142 A1 | 11/2013 | Straaijer | |
| 2015/0261097 A1 | 9/2015 | Mathijssen et al. | |
| 2016/0161863 A1 | 6/2016 | Den Boef et al. | |
| 2016/0170136 A1* | 6/2016 | Johansen | G02B 6/02376 372/6 |
| 2016/0370717 A1 | 12/2016 | Den Boef et al. | |
| 2018/0275048 A1* | 9/2018 | Das | G01N 21/3504 |
| 2019/0302570 A1 | 10/2019 | Kumar et al. | |
| 2020/0285129 A1 | 9/2020 | Uebel et al. | |
| 2021/0124112 A1* | 4/2021 | Uebel | C03B 37/15 |
| 2021/0396931 A1* | 12/2021 | Harker | G02B 6/255 |
| 2022/0187680 A1* | 6/2022 | Ravensbergen | H01S 3/06741 |

FOREIGN PATENT DOCUMENTS

| | | | |
|---|---|---|---|
| EP | 1628164 | 2/2006 | |
| TW | 201712381 | 4/2017 | |
| TW | 202038023 | 10/2020 | |
| WO | 2011012624 | 2/2011 | |
| WO | 2016102127 | 6/2016 | |
| WO | 2017032454 | 3/2017 | |
| WO | WO-2018001442 A1 * | 1/2018 | .......... H01S 3/0621 |
| WO | 2018127266 | 7/2018 | |
| WO | 2020083624 | 4/2020 | |

OTHER PUBLICATIONS

European Search Report issued in corresponding European Patent Application No. 20213013, dated Apr. 28, 2021.
Pennetta, R. et al: "Fabrication and non-destructive characterization of tapered single-ring hollow-core photonic crystal fiber," APL Photonics 4, 056105 (May 2019).
Birks, T.S. et al., "Supercontinuum generation in tapered fibers", Opt. Lett. 25 (19), 1415 (2000).
Sorenzen, S.T.: "Deep-blue supercontinuum light sources based on tapered photonic crystal fibres", Thesis, Technical University of Denmark, Fotonik at backend.orbit.dtu.dk/ws/portalfiles/portal/56937428/Thesis_noPapers_2.pdf (accessed on Nov. 30, 2021) (2013).
Travers, J.C.: "Blue extension of optical fibre supercontinuum generation", Journal of Optics, vol. 12 (2010).
Habib, S. et al.: "Extreme UV Light Generation Through Dispersive Wave Trapping in a Tapered Gas-Filled Hollow Fiber", IEEE Photonics Technology Letters, vol. 31, No. 10 (May 15, 2019).
Habib, S. et al: "Multi-stage generation of extreme ultraviolet dispersive waves by tapering gas-filled hollow-core anti-resonant fibers", Optics Express, vol. 26, No. 19 (2018).
Joly, N.L., et al.: "Pressure-tuned phase-matched generation of non-classical light in microstructured fibre", 23rd Opto-Electronics and Communications Conference (OECC) Technical Digest, IEEE (Jul. 2018).
Yu, F. et al. "Attenuation limit of silica-based hollow-core fiber at mid-IR wavelengths," APL Photonics 4, 080803 (2019).
Kolesnichenko, P.V. et al., "Background-free time-resolved coherent Raman spectroscopy (CSRS and CARS): Heterodyne detection of low-energy vibration and identification of excited-state contributions," APL Photonics 4, 056102 (2019).
Office Action dated Oct. 26, 2022, issued in corresponding Taiwan Patent Application No. 110145981, pp. 1-19.
Search Report issued in corresponding Taiwanese Patent Application No. 110145981, dated Feb. 25, 2023.

* cited by examiner

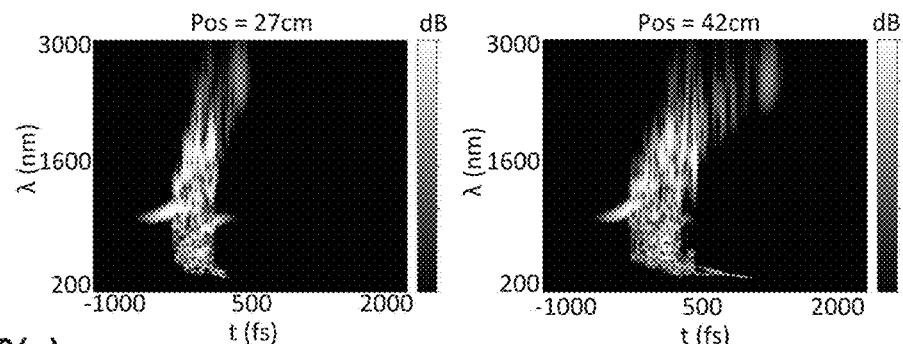
Fig. 20(a)  Fig. 20(b)
Fig. 20(c)  Fig. 20(d)
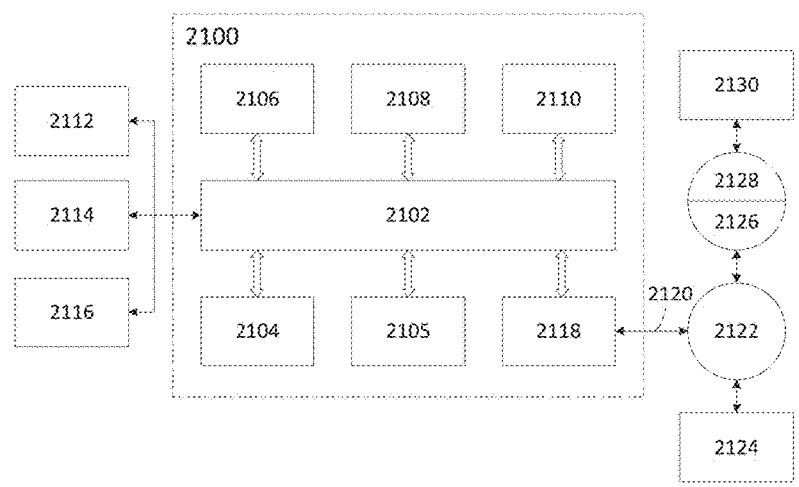
Fig. 21

US 11,846,867 B2

HOLLOW-CORE PHOTONIC CRYSTAL FIBER BASED BROADBAND RADIATION GENERATOR

This applications claims the benefit of priority of European patent application no. 20213013.4, filed Dec. 10, 2020, and of European patent application no. 21178292.5, filed Jun. 8, 2021, each of the foregoing applications is incorporated herein in its entirety by reference.

FIELD

The present description relates to a hollow-core photonic crystal fiber based broadband radiation generator, and in particular such a broadband radiation generator in relation to metrology applications in the manufacture of integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

Metrology tools are used in many aspects of the IC manufacturing process, for example as alignment tools for proper positioning of a substrate prior to an exposure, leveling tools to measure a surface topology of the substrate, for e.g., focus control and scatterometry based tools for inspecting/measuring the exposed and/or etched product in process control. In each case, a radiation source is required. For various reasons, including measurement robustness and accuracy, broadband or white light radiation sources are increasingly used for such metrology applications. It would be desirable to improve on present devices for broadband radiation generation.

SUMMARY

In an aspect, there is provided a broadband radiation source device, being configured for generating a broadband output radiation upon receiving pump radiation, comprising: a hollow-core photonic crystal fiber (HC-PCF) comprising at least one structurally varied portion having at least one structural parameter of the HC-PCF varied with respect to one or more main portions of the HC-PCF, wherein the at least one structurally varied portion comprises at least a first structurally varied portion located downstream of a position along the length of the HC-PCF where the pump radiation will be spectrally expanded by a modulation instability dominated nonlinear optical process, and wherein the at least one structurally varied portion is configured and located such that the broadband output radiation comprises wavelengths in the ultraviolet spectral region.

In an aspect, there is provided a method of optimizing a location of at least a first structurally varied portion along a length of a hollow-core photonic crystal fiber (HC-PCF), such that broadband output radiation generated from the HC-PCF following excitation by input radiation comprises wavelengths in the ultraviolet region, wherein the optimization comprises: determining a location along the length of the HC-PCF where the pump radiation will be spectrally expanded by a modulation instability dominated nonlinear optical process, and locating the first structurally varied portion downstream of the determined location.

Other aspects of the invention comprise metrology device comprising a broadband radiation source device as described herein.

BRIEF DESCRIPTION OF THE DRAWINGS

Embodiments of the invention will now be described, by way of example only, with reference to the accompanying schematic drawings, in which:

FIGS. 20(a) and 20(b) show two spectrograms of a simulation describing the temporal and spectral distribution of a pulse of input radiation after propagating through a uniform hollow core optical fiber a distance of 27 cm and a distance of 42 cm, respectively;

FIGS. 20(c) and 20(d) show two spectrograms of a simulation describing the temporal and spectral distribution of a pulse of input radiation after propagating through a single-waisted hollow core optical fiber (e.g., as shown in FIG. 19) a distance of 27 cm and a distance of 42 cm, respectively; and FIG. 21 depicts a block diagram of a computer system for a broadband radiation source.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
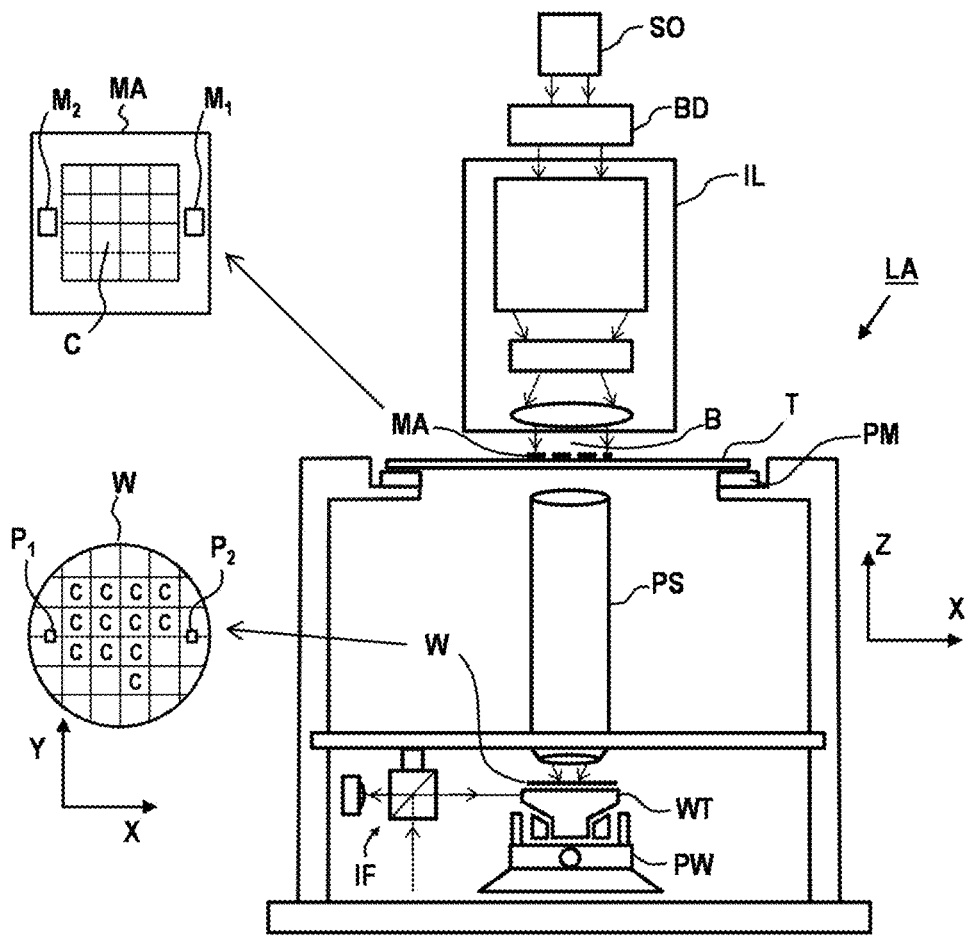
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein its entirety by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
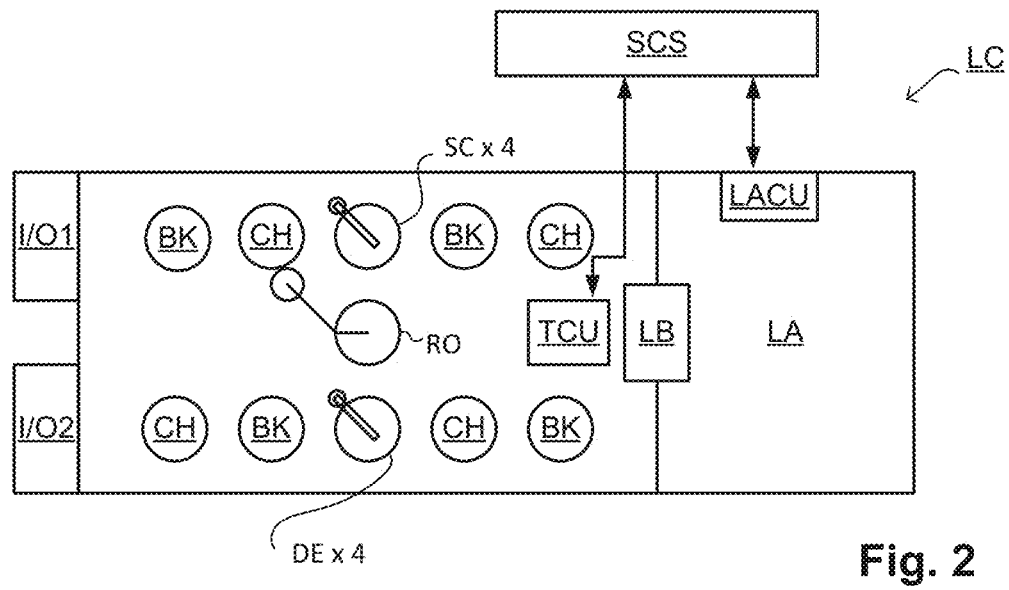
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
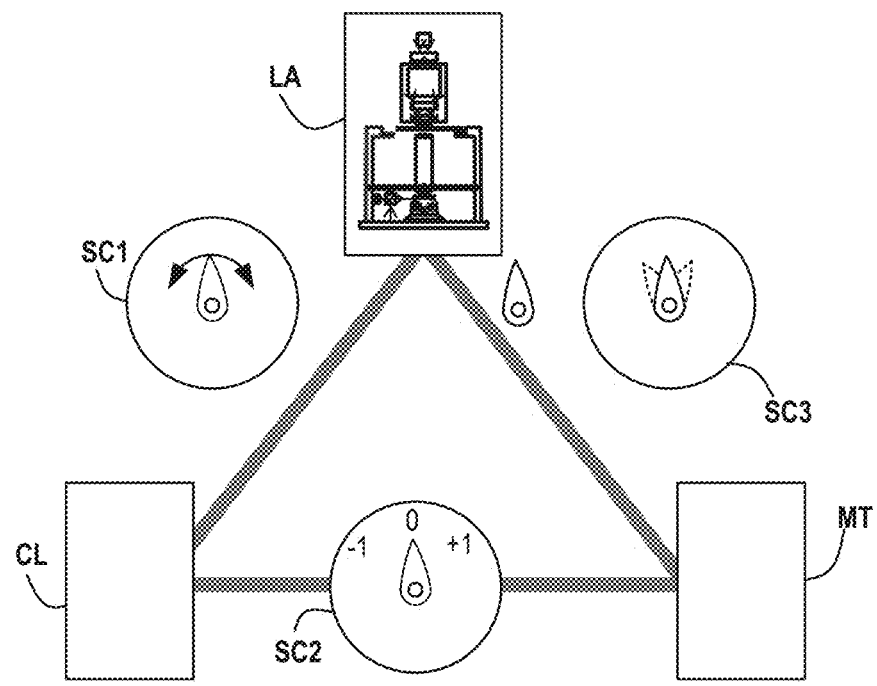
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such metrology tools and the associated measurement techniques are further described in U.S. patent applications publication nos. US20100328655, US2011102753, US20120044470, US20110249244, and US20110026032 and European patent application publication no. EP1,628,164, each of the foregoing patent application publications incorporated herein its entirety by reference thereto. Metrology tools may measure gratings using radiation from soft x-ray and visible to near-IR wavelength range.

In a first embodiment, the metrology tool MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the metrology tool MT is a spectroscopic scatterometer. In such a spectroscopic scatterometer, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the metrology tool MT is an ellipsometric scatterometer. The ellipsometric scatterometer allows for determining parameters of a lithographic process by measuring scattered radiation for each polarization state. Such metrology apparatus emits polarized radiation (such as linear, circular, or elliptic) by using, for example, appropriate polarization filters in the illumination section of the metrology apparatus. A source suitable for the metrology apparatus may provide polarized radiation as well. Various embodiments of existing scatterometers are described in U.S. Patent Application Publication Nos. 2007-0296960, 2008-0198380, 2009-0168062, 2010-0007863, 2011-0032500, 2011-0102793, 2011-0188020, 2012-0044495, 2013-0162996 and 2013-0308142, each of which is incorporated herein in its entirety by reference.

In one embodiment of the metrology tool MT, the metrology tool MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the wafer. The metrology tool may have a symmetrical detection configuration as described e.g. in European patent application publication no. EP1,628,164, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 or U.S. patent application publication no. US 20160161863, each of which is incorporated herein in its entirety by reference.

Other parameters of interest may be focus and dose. Focus and dose may be determined simultaneously by scatterometry (or alternatively by scanning electron microscopy) as described in U.S. patent application publication no. US2011-0249244, which is incorporated herein in its entirety by reference. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings, formed by a lithographic process, mostly in resist, but also after etch process for example. Typically the pitch and line-width of the structures in the gratings strongly depend on the measurement optics (in particular the NA of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resembles the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target or via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in U.S. patent application publication nos. US2016-0161863 and US 2016/0370717, which are incorporated herein in their entireties by reference.

Figure 4:
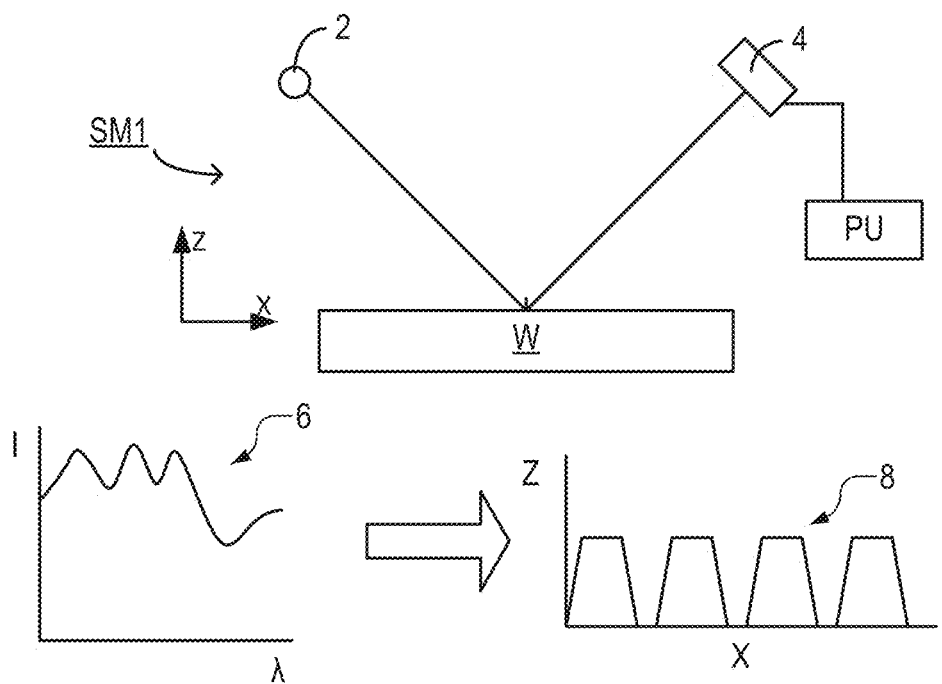
FIG. 4 depicts a schematic overview of a scatterometry apparatus used as a metrology device, which may comprise a radiation source according to embodiments of the invention.

A metrology apparatus, such as a scatterometer, is depicted in FIG. 4. It comprises a broadband (e.g., white light) radiation projector 2 which projects radiation onto a substrate 6. The reflected or scattered radiation is passed to a spectrometer detector 4, which measures a spectrum 10 (i.e. a measurement of intensity as a function of wavelength) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Another type of metrology tool used in IC manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
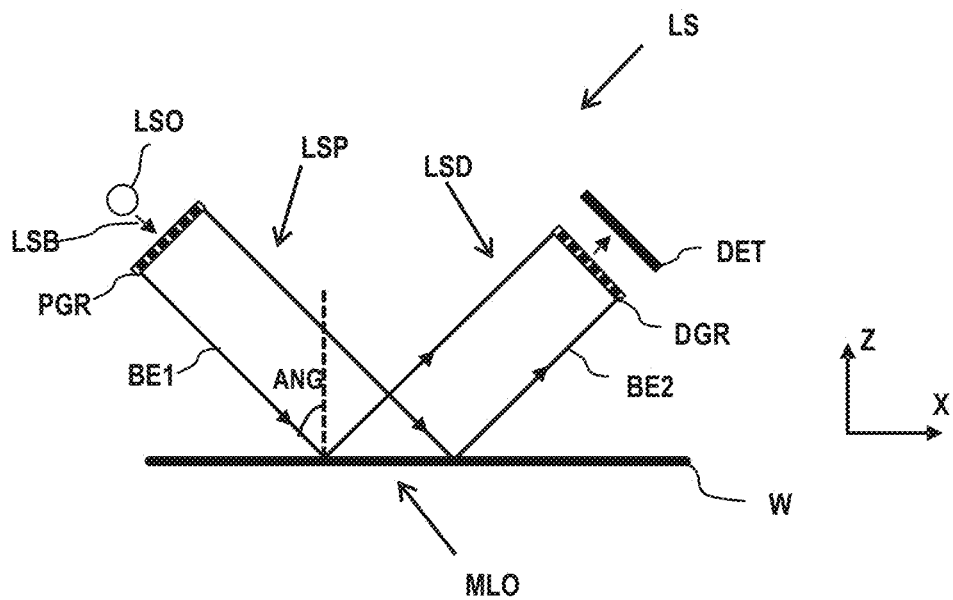
FIG. 5 depicts a schematic overview of a level sensor apparatus which may comprise a radiation source according to embodiments of the invention.

An example of a level or height sensor LS as known in the art is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband radiation source, such as a supercontinuum radiation source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the radiation received, for example indicative of the intensity of the radiation received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both of which are incorporated herein in their entireties by reference. A height sensor using UV radiation instead of visible or infrared radiation is disclosed in U.S. patent application publication no. US2010233600A1, which is incorporated herein in its entirety by reference. In PCT patent application publication no. WO2016102127, which is incorporated herein in its entirety by reference, a compact height sensor is described which uses a multi-element detector to detect and recognize the position of a grating image, without needing a detection grating.

Another type of metrology tool used in device manufacture is an alignment sensor. A significant aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor is based on a self-referencing interferometer as described in U.S. Pat. No. 6,961,116, which is incorporated herein in its entirety by reference. Various enhancements and modifications of the position sensor have been developed, for example as disclosed in U.S. patent application publication no. US 2015261097, which is incorporated herein in its entirety by reference.

Figure 6:
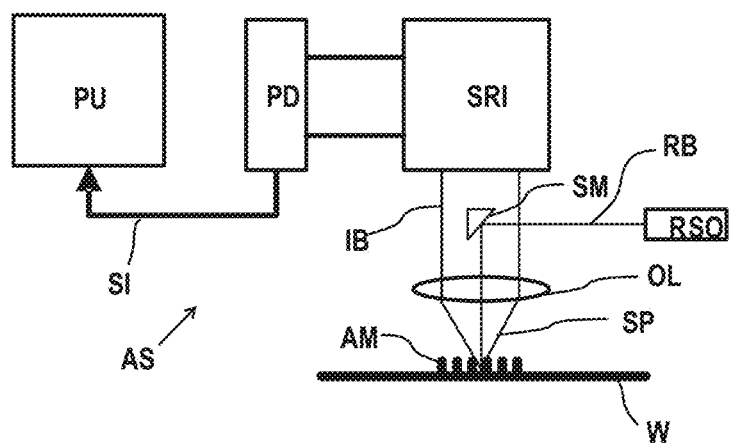
FIG. 6 depicts a schematic overview of an alignment sensor apparatus which may comprise a radiation source according to embodiments of the invention.

FIG. 6 is a schematic block diagram of an embodiment of an alignment sensor AS, such as is described, for example, in U.S. Pat. No. 6,961,116. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in cross-sectional width (e.g., diameter) than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Metrology tools MT, such as a scatterometer, topography measurement system, or position measurement system mentioned above may use radiation originating from a radiation source to perform a measurement. The properties of the radiation used by a metrology tool may affect the type and quality of measurements that may be performed. For some applications, it may be advantageous to use multiple radiation frequencies to measure a substrate, for example broadband radiation may be used. Multiple different frequencies may be able to propagate, irradiate, and scatter off a metrology target with no or minimal interference with other frequencies. Therefore different frequencies may for example be used to obtain more metrology data simultaneously. Different radiation frequencies may also be able to interrogate and discover different properties of a metrology target. Broadband radiation may be useful in metrology systems MT such as for example level sensors, alignment mark measurement systems, scatterometry tools, or inspection tools. A broadband radiation source may be a supercontinuum source.

High quality broadband radiation, for example supercontinuum radiation, may be difficult to generate. One method for generating broadband radiation may be to broaden high-power narrow band or single frequency input radiation or pump radiation, for example making use of non-linear, higher order effects. The input radiation (which may be produced using a laser) may be referred to as pump radiation. Alternatively, the input radiation may be referred to as seed radiation. To obtain high power radiation for broadening effects, radiation may be confined into a small area so that strongly localized high intensity radiation is achieved. In those areas, the radiation may interact with broadening structures and/or materials forming a non-linear medium so as to create broadband output radiation. In the high intensity radiation areas, different materials and/or structures may be used to enable and/or improve radiation broadening by providing a suitable non-linear medium.

In some implementations, the broadband output radiation is created in a photonic crystal fiber (PCF). In several embodiments, such a photonic crystal fiber has microstructures around its fiber core assisting in confining radiation that travels through the fiber in the fiber core. The fiber core can be made of a solid material that has non-linear properties and that is capable of generating broadband radiation when high intensity pump radiation is transmitted through the fiber core. Although it is feasible to generate broadband radiation in solid core photonic crystal fibers, there may be a few disadvantages of using a solid material. For example, if UV radiation is generated in the solid core, this radiation might not be present in the output spectrum of the fiber because the radiation is absorbed by most solid material.

In some implementations, as discussed further below with reference to FIG. 8, methods and apparatus for broadening input radiation may use a fiber for confining input radiation, and for broadening the input radiation to output broadband radiation. The fiber may be a hollow core fiber, and may comprise internal structures to achieve effective guiding and confinement of radiation in the fiber. The fiber may be a hollow core photonic crystal fiber (HC-PCF), which is particularly suitable for strong radiation confinement, predominantly inside the hollow core of the fiber, achieving high radiation intensities. The hollow core of the fiber may be filled with a gas acting as a broadening medium for broadening input radiation. Such a fiber and gas arrangement may be used to create a supercontinuum radiation source. Radiation input to the fiber may be electromagnetic radiation, for example radiation in one or more of the infrared, visible, UV, and extreme UV spectra. The output radiation may consist of or comprise broadband radiation, which may be white light.

Some embodiments relate to a new design of such a broadband radiation source comprising an optical fiber. The optical fiber is a hollow-core, photonic crystal fiber (HC-PCF). In particular, the optical fiber may be a hollow-core, photonic crystal fiber of a type comprising anti-resonant structures for confinement of radiation. Such fibers comprising anti-resonant structures are known in the art as anti-resonant fibers, tubular fibers, single-ring fibers, negative curvature fibers or inhibited coupling fibers. Various different designs of such fibers are known in the art. Alternatively, the optical fiber may be photonic bandgap fibers (HC-PBFs, for example a Kagome fiber).

Figure 9A:
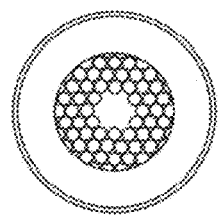
FIGS. 9(a) and 9(b) schematically depict transverse cross-sections of examples of hollow core photonic crystal fiber (HC-PCF) designs for supercontinuum generation.

A number of types of HC-PCFs can be engineered, each based on a different physical guidance mechanism. Two such HC-PCFs include: hollow-core photonic bandgap fibers (HC-PBFs) and hollow-core anti-resonant reflecting fibers (HC-ARFs). Detail on the design and manufacture of HC-PCFs can be found in U.S. patent application publication no. US 2004/015085 (for HC-PBFs) and PCT patent application publication no. WO2017/032454 (for HC-ARFs), which are incorporated herein in their entireties by reference. FIG. 9(a) shows a Kagome fiber, comprising a Kagome lattice structure.

Figure 7:
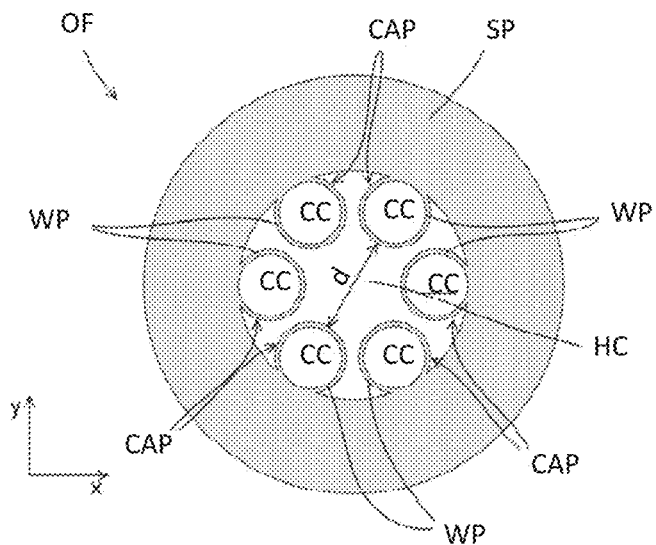
FIG. 7 is a schematic cross sectional view of a hollow core optical fiber that may form part of a radiation source according to an embodiment in a transverse plane (i.e. perpendicular to an axis of the optical fiber)

An example of an optical fiber for use in the radiation source is now described with reference to FIG. 7, which is a schematic cross sectional view of the optical fiber OF in a transverse plane. Further embodiments similar to the practical example of the fiber of FIG. 7 are disclosed in PCT patent application publication no. WO2017/032454.

The optical fiber OF comprises an elongate body, which is longer in one dimension compared to the other two dimensions of the fiber OF. This longer dimension may be referred to as an axial direction and may define an axis of the optical fiber OF. The two other dimensions define a plane which may be referred to as a transverse plane. FIG. 7 shows a cross-section of the optical fiber OF in this transverse plane (i.e. perpendicular to the axis), which is labelled as the x-y plane. The transverse cross-section of the optical fiber OF may be substantially constant along the fiber axis.

It will be appreciated that the optical fiber OF has some degree of flexibility and therefore the direction of the axis will not, in general, be uniform along the length of the optical fiber OF. The terms such as the optical axis, the transverse cross-section and the like will be understood to mean the local optical axis, the local transverse cross-section and so on. Furthermore, where components are described as being cylindrical or tubular these terms will be understood to encompass such shapes that may have been distorted as the optical fiber OF is flexed.

The optical fiber OF may have any length and it will be appreciated that the length of the optical fiber OF may be dependent on the application. The optical fiber OF may have a length between 1 cm and 10 m, for example, the optical fiber OF may have a length between 10 cm and 100 cm.

The optical fiber OF comprises: a hollow core HC; a cladding portion surrounding the hollow core HC; and a support portion SP surrounding and supporting the cladding portion. The optical fiber OF may be considered to comprise a body (comprising the cladding portion and the support portion SP) having a hollow core HC. The cladding portion comprises a plurality of anti-resonance elements for guiding radiation through the hollow core HC. In particular, the plurality of anti-resonance elements are arranged to confine radiation that propagates through the optical fiber OF predominantly inside the hollow core HC and to guide the radiation along the optical fiber OF. The hollow core HC of the optical fiber OF may be disposed substantially in a central region of the optical fiber OF, so that the axis of the optical fiber OF may also define an axis of the hollow core HC of the optical fiber OF.

The cladding portion comprises a plurality of anti-resonance elements for guiding radiation propagating through the optical fiber OF. In particular, in this embodiment, the cladding portion comprises a single ring of tubular capillaries CAP. Each of the tubular capillaries CAP acts as an anti-resonance element.

The capillaries CAP may also be referred to as tubes. The capillaries CAP may be circular in cross section, or may have another shape. Each capillary CAP comprises a generally cylindrical wall portion WP that at least partially defines the hollow core HC of the optical fiber OF and separates the hollow core HC from a capillary cavity CC. It will be appreciated that the wall portion WP may act as an anti-reflecting Fabry-Perot resonator for radiation that propagates through the hollow core HC (and which may be incident on the wall portion WP at a grazing incidence angle). The thickness of the wall portion WP may be suitable so as to ensure that reflection back into the hollow core HC is generally enhanced whereas transmission into the capillary cavity CC is generally suppressed. In some embodiments, the capillary wall portion WP may have a thickness between 0.01-10.0 μm.

It will be appreciated that, as used herein, the term cladding portion is intended to mean a portion of the optical fiber OF for guiding radiation propagating through the optical fiber OF (i.e. the capillaries CAP which confine the radiation within the hollow core HC). The radiation may be confined in the form of transverse modes, propagating along the fiber axis.

The support portion is generally tubular and supports the capillaries CAP of the cladding portion. The capillaries CAP are distributed evenly around an inner surface if the inner support portion SP. The capillaries CAP may be described as being disposed in a generally hexagonal formation.

The capillaries CAP are arranged so that each capillary is not in contact with any of the other capillaries CAP. Each of the capillaries CAP is in contact with the inner support portion SP and spaced apart from adjacent capillaries CAP in the ring structure. Such an arrangement may be beneficial since it may increase a transmission bandwidth of the optical fiber OF (relative, for example, to an arrangement wherein the capillaries are in contact with each other). Alternatively, in some embodiments, each of the capillaries CAP may be in contact with adjacent capillaries CAP in the ring structure.

The capillaries CAP of the cladding portion are disposed in a ring structure around the hollow core HC. An inner surface of the ring structure of capillaries CAP at least partially defines the hollow core HC of the optical fiber OF. The cross-sectional width (e.g., diameter) d of the hollow core HC (which may be defined as the smallest dimension between opposed capillaries, indicated by arrow d) may be between 10 and 1000 µm. The cross-sectional width d of the hollow core HC may affect the mode field diameter, impact loss, dispersion, modal plurality, and non-linearity properties of the hollow core HC optical fiber OF.

In this embodiment, the cladding portion comprises a single ring arrangement of capillaries CAP (which act as anti-resonance elements). Therefore, a line in any radial direction from a center of the hollow core HC to an exterior of the optical fiber OF passes through no more than one capillary CAP.

It will be appreciated that other embodiments may be provided with different arrangements of anti-resonance elements. These may include arrangements having multiple rings of anti-resonance elements and arrangements having nested anti-resonance elements. FIG. 9(a) shows an embodiment of HC-PCFs with three rings of capillaries stacking on top of each other along the radial direction. In this embodiment, each capillary is in contact with other capillaries both in the same ring and in a different ring. Furthermore, although the embodiment shown in FIG. 7 comprises a ring of six capillaries, in other embodiments, one or more rings comprising any number of anti-resonance elements (for example 4, 5, 6, 7, 8, 9, 10, 11 or 12 capillaries) may be provided in the cladding portion.

Figure 9B:
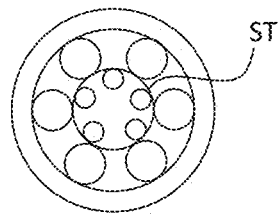

FIG. 9(b) shows a modified embodiment of the above discussed HC-PCFs with a single ring of tubular capillaries. In the example of FIG. 9(b) there are two coaxial rings of tubular capillaries. For holding the inner and outer rings of tubular capillaries, a support tube ST may be included in the HC-PCF. The support tube may be made of silica.

The tubular capillaries of the examples of FIG. 7 and FIGS. 9(a) and (b) may have a circular cross-sectional shape. Other shapes are also possible for the tubular capillaries, like elliptical or polygonal cross-sections. Additionally, the solid material of the tubular capillaries of the examples of FIG. 7 and FIGS. 9(a) and (b) may comprise plastic material, like PMA, glass, like silica, or soft glass.

Figure 8:
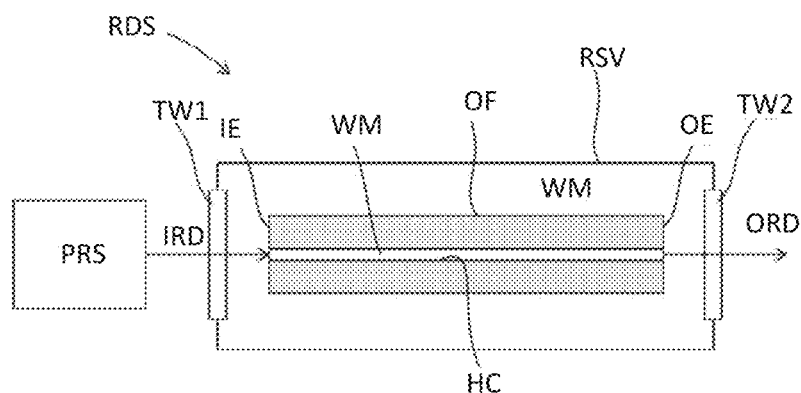
FIG. 8 depicts a schematic representation of a radiation source according to an embodiment for providing broadband output radiation.

FIG. 8 depicts a radiation source RDS for providing broadband output radiation. The radiation source RDS comprises a pulsed pump radiation source PRS or any other type of source that is capable of generating short pulses of a desired length and energy level; an optical fiber OF (for example of the type shown in FIG. 7) with a hollow core HC; and a working medium WM (for example a gas) disposed within the hollow core HC. Although in FIG. 8 the radiation source RDS comprises the optical fiber OF shown in FIG. 7, in alternative embodiments other types of hollow core HC optical fiber OF may be used.

The pulsed pump radiation source PRS is configured to provide input radiation IRD. The hollow core HC of the optical fiber OF is arranged to receive the input radiation IRD from the pulsed pump radiation source PRS, and broaden it to provide output radiation ORD. The working medium WM enables the broadening of the frequency range of the received input radiation IRD so as to provide broadband output radiation ORD.

The radiation source RDS further comprises a reservoir RSV. The optical fiber OF is disposed inside the reservoir RSV. The reservoir RSV may also be referred to as a housing, container or gas cell. The reservoir RSV is configured to contain the working medium WM. The reservoir RSV may comprise one or more features, known in the art, for controlling, regulating, and/or monitoring the composition of the working medium WM (which may be a gas) inside the reservoir RSV. The reservoir RSV may comprise a first transparent window TW1. In use, the optical fiber OF is disposed inside the reservoir RSV such that the first transparent window TW1 is located proximate to an input end IE of the optical fiber OF. The first transparent window TW1 may form part of a wall of the reservoir RSV. The first transparent window TW1 may be transparent for at least the received input radiation frequencies, so that received input radiation IRD (or at least a large portion thereof) may be coupled into the optical fiber OF located inside reservoir RSV. It will be appreciated that optics (not shown) may be provided for coupling the input radiation IRD into the optical fiber OF.

The reservoir RSV comprises a second transparent window TW2, forming part of a wall of the reservoir RSV. In use, when the optical fiber OF is disposed inside the reservoir RSV, the second transparent window TW2 is located proximate to an output end OE of the optical fiber OF. The second transparent window TW2 may be transparent for at least the frequencies of the broadband output radiation ORD of the apparatus 120.

Alternatively, in another embodiment, the two opposed ends of the optical fiber OF may be placed inside different reservoirs. The optical fiber OF may comprise a first end section configured to receive input radiation IRD, and a second end section for outputting broadband output radiation ORD. The first end section may be placed inside a first reservoir, comprising a working medium WM. The second end section may be placed inside a second reservoir, wherein the second reservoir may also comprise a working medium WM. The functioning of the reservoirs may be as described in relation to FIG. 8 above. The first reservoir may comprise a first transparent window, configured to be transparent for input radiation IRD. The second reservoir may comprise a second transparent window configured to be transparent for broadband output broadband radiation ORD. The first and second reservoirs may also comprise a sealable opening to permit the optical fiber OF to be placed partially inside and partially outside the reservoir, so that a gas can be sealed inside the reservoir. The optical fiber OF may further comprise a middle section not contained inside a reservoir. Such an arrangement using two separate gas reservoirs may be particularly convenient for embodiments wherein the optical fiber OF is relatively long (for example when the length is more than 1 m). It will be appreciated that for such arrangements which use two separate gas reservoirs, the two reservoirs (which may comprise one or more features, known in the art, for controlling, regulating, and/or monitoring the composition of a gas inside the two reservoirs) may be considered to provide an apparatus for providing the working medium WM within the hollow core HC of the optical fiber OF.

In this context a window may be transparent for a frequency if at least 50%, 75%, 85%, 90%, 95%, or 99% of incident radiation of that frequency on the window is transmitted through the window.

Both the first TW1 and the second TW2 transparent windows may form a gastight seal within the walls of the reservoir RSV so that the working medium WM (which may be a gas) may be contained within the reservoir RSV. It will be appreciated that the gas WM may be contained within the reservoir RSV at a pressure different to the ambient pressure of the reservoir RSV.

The working medium WM may comprise a noble gas such as argon, krypton, and/or xenon, a Raman active gas such as hydrogen, deuterium and/or nitrogen, or a gas mixture such as an argon/hydrogen mixture, a xenon/deuterium mixture, a krypton/nitrogen mixture, or a nitrogen/hydrogen mixture. Depending on the type of filling gas, the nonlinear optical processes can include modulational instability (MI), soliton self-compression, soliton fission, Kerr effect, Raman effect and dispersive wave generation (DWG), details of which are described in PCT patent application publication no. WO2018/127266A1 and U.S. Pat. No. 9,160,137B1 (both of which are hereby incorporated in their entireties by reference). Since the dispersion of the filling gas can be tuned by varying the working medium WM pressure in the reservoir RSR (i.e. gas cell pressure), the generated broadband pulse dynamics and the associated spectral broadening characteristics can be adjusted so as to optimize the frequency conversion In one implementation, the working medium WM may be disposed within the hollow core HC at least during receipt of input radiation IRD for producing broadband output radiation ORD. It will be appreciated that, while the optical fiber OF is not receiving input radiation IRD for producing broadband output radiation, the gas WM may be wholly or partially absent from the hollow core HC.

In order to achieve frequency broadening high intensity radiation may be desirable. An advantage of having a hollow core HC optical fiber OF is that it may achieve high intensity radiation through strong spatial confinement of radiation propagating through the optical fiber OF, achieving high localized radiation intensities. The radiation intensity inside the optical fiber OF may be high, for example due to high received input radiation intensity and/or due to strong spatial confinement of the radiation inside the optical fiber OF. An advantage of hollow core optical fibers is that they can guide radiation having a broader wavelength range that solid-core fibers and, in particular, hollow core optical fibers can guide radiation in both the ultraviolet and infrared ranges.

An advantage of using a hollow core HC optical fiber OF may be that the majority of the radiation guided inside the optical fiber OF is confined to the hollow core HC. Therefore, the majority of the interaction of the radiation inside the optical fiber OF is with the working medium WM, which is provided inside the hollow core HC of the optical fiber OF. As a result, the broadening effects of the working medium WM on the radiation may be increased.

The received input radiation IRD may be electromagnetic radiation. The input radiation IRD may be received as pulsed radiation. For example, the input radiation IRD may comprise ultrafast pulses, for example, generated by a laser.

The input radiation IRD may be coherent radiation. The input radiation IRD may be collimated radiation, an advantage of which may be to facilitate and improve the efficiency of coupling the input radiation IRD into the optical fiber OF. The input radiation IRD may comprise a single frequency, or a narrow range of frequencies. The input radiation IRD may be generated by a laser. Similarly, the output radiation ORD may be collimated and/or may be coherent.

The broadband range of the output radiation ORD may be a continuous range, comprising a continuous range of radiation frequencies. The output radiation ORD may comprise supercontinuum radiation. Continuous radiation may be beneficial for use in a number of applications, for example in metrology applications. For example, the continuous range of frequencies may be used to interrogate a large number of properties. The continuous range of frequencies may for example be used to determine and/or eliminate a frequency dependency of a measured property. Supercontinuum output radiation ORD may comprise for example electromagnetic radiation over a wavelength range of 100 nm-4000 nm. The broadband output radiation ORD frequency range may be for example 400 nm-900 nm, 500 nm-900 nm, or 200 nm-2000 nm. The supercontinuum output radiation ORD may comprise white light.

The input radiation IRD provided by the pulsed pump radiation source PRS may be pulsed. The input radiation IRD may comprise electromagnetic radiation of one or more frequencies between 200 nm and 2 µm. The input radiation IRD may for example comprise electromagnetic radiation with a wavelength of 1.03 µm. The repetition rate of the pulsed radiation IRD may be of an order of magnitude of 1 kHz to 100 MHz. The pulse energies may have an order of magnitude of 0.1 µJ to 100 µJ, for example 1-10 µJ. A pulse duration for the input radiation IRD may be between 10 fs and 10 ps, for example 300 fs. The average power of input radiation IRD may be between 100 mW to several 100 W. The average power of input radiation IRD may for example be 20-50 W.

The pulsed pump radiation source PRS may be a laser. One or more spatio-temporal transmission characteristics of such a laser pulse, e.g. its spectral amplitude and phase, transmitted along the optical fiber OF can be varied and tuned through adjustment of one or more (pump) laser parameters, one or more working component WM variations, and/or one or more optical fiber OF parameters. The one or more spatio-temporal transmission characteristics may include one or more selected from: output power, output mode profile, output temporal profile, width of the output temporal profile (or output pulse width), output spectral profile, and/or bandwidth of the output spectral profile (or output spectral bandwidth). The one or more pulsed pump radiation source PRS parameters may include one or more selected from: pump wavelength, pump pulse energy, pump pulse width, and/or pump pulse repetition rate. The one or more optical fiber OF parameters may include one or more selected from: optical fiber length, size and/or shape of the hollow core HC, size and/or shape of the capillaries, and/or thickness of the walls of the capillaries surrounding the hollow core HC. The one or more working component WM, e.g. filling gas, parameters may include one or more selected from: gas type, gas pressure and/or gas temperature.

The broadband output radiation ORD provided by the radiation source RDS may have an average output power of at least 1 W. The average output power may be at least 5 W.

The average output power may be at least 10 W. The broadband output radiation ORD may be pulsed broadband output radiation ORD. The broadband output radiation ORD may have a power spectral density in the entire wavelength band of the output radiation of at least 0.01 mW/nm. The power spectral density in the entire wavelength band of the broadband output radiation may be at least 3 mW/nm.

In many applications that require broadband output radiation ORD, such as the aforementioned metrology applications, there is a growing interest in further extending the short wavelength edge of the broadband output radiation ORD, in particular extending into the ultraviolet (UV) wavelength region. The desired wavelength region may comprise wavelengths down to 400 nm, down to 350 nm, down to 300 nm, down to 200 nm, down to 100 nm, down to 50 nm or down to 10 nm for example. Radiation sources RDS that are capable of emitting broadband output radiation ORD (e.g., supercontinuum or white light) with a smooth (or flat) spectral profile and an extended short wavelength edge are highly desirable in applications where better wavelength versatility and thus greater flexibility are sought after. For example, a smooth and UV-extended supercontinuum is particularly useful in overlay metrology applications where existing radiation sources are unable to meet the ongoing demand of using targets with smaller pitch sizes and higher numbers of layers. Extended UV wavelengths are capable of resolving smaller target gratings and penetrating more target layers. A smooth and UV-extended spectral profile also enables accurate and reliable wavelength switching between different spectral ranges for different applications or for optimizing measurement performance.

At present, several methods have been adopted to further extend the short wavelength edge of broadband output radiation ORD generated in an optical fiber OF. These methods include a) using a longer optical fiber OF; b) using an optical fiber with a smaller core cross-sectional width (e.g., diameter); and c) using a lower gas pressure. When used separately or in combination, such methods facilitate generation of UV wavelengths by allowing phasing matching conditions to be fulfilled in the UV region. However, such methods can have many disadvantages. For example, a longer hollow core HC optical fiber OF (e.g., a HC-PCF) typically requires a larger reservoir RSV which leads to larger physical dimensions of a broadband radiation source RDS and higher manufacturing costs. A radiation source with a large footprint makes it unsuitable for many applications where only limited space is provided to accommodate the radiation source. Decreasing the core cross-sectional width (e.g., diameter) of a hollow core HC optical fiber OF increases the propagation loss in the fiber, resulting in lower conversion efficiencies and undesired (e.g., imbalanced or peaky) spectral profiles. In addition, fabrication of hollow core HC optical fibers OF with smaller core cross-sectional widths (e.g., diameters) in a drawing tower is very challenging, thereby resulting in higher manufacturing costs. Reducing the gas pressure significantly reduces the nonlinearity in the gas-filled hollow core HC, also resulting in lower conversion efficiencies and undesired (e.g., imbalanced or peaky) spectral profiles. To maintain the same level of nonlinearity in a lower gas pressure, a pulsed pump radiation source PRS with higher pulse energies will be required. However, such high pulse energy pump radiation sources PRS can be very expensive.

Figure 10:
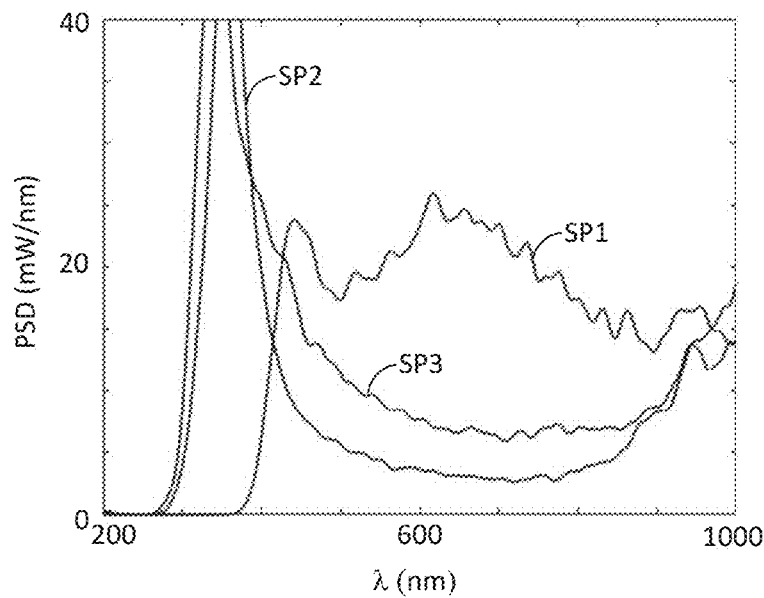
FIG. 10 is a plot of point spread power spectral density (PSD) against wavelength λ describing a simulation of three output spectra generated respectively from a fiber with 30 μm core diameter, a fiber with 20 μm core diameter, and a fiber with 30 μm core diameter operating at a lower pressure.

FIG. 10 is a plot of point spread power spectral density (PSD) against wavelength λ describing a simulation of three output spectra generated respectively from a fiber with 30 μm core diameter, a fiber with 20 μm core diameter, and a fiber with 30 μm core diameter operating at a lower pressure. As shown in FIG. 10, the first output spectrum SP1 is generated in a first HC-PCF having a core diameter of 30 μm and filled with a working medium of krypton gas at a pressure of 25.7 bar. The pulse energy and the pulse repetition rate of the input radiation IRD is 5.3 μJ and 5 MHz, respectively. The second output spectrum SP2 is generated in a second HC-PCF having a core diameter of 20 μm and filled with the same working medium of krypton gas at the same pressure of 25.7 bar. The pulse energy and the pulse repetition rate of the input radiation IRD is 2.4 μJ and 10.6 MHz, respectively. The third output spectrum SP3 is generated in the first HC-PCF filled with the same working medium but at a lower pressure (i.e., lower than 25.7 bar). The pulse energy and the pulse repetition rate of the input radiation IRD is 9.7 μJ and 2.7 MHz, respectively. In the simulation, when the pulse energy is changed, the pulse repetition rate is adjusted accordingly so as to maintain a constant average power of the input radiation IRD.

In contrast to the first output spectrum SP1, both the second and third output spectra SP2, SP3 comprise a sharp spectral peak located at the short-wavelength side around 350 nm. Since a significant portion of the pump power is converted to the sharp spectral peak, the PSD of the spectral components in other spectral regions, e.g., the visible and near-IR regions, is very low. For many applications where a smooth broadband spectrum is desired (e.g., scatterometry based metrology applications), such imbalanced or peaky spectral profiles can be problematic and unreliable. For example, in metrology applications, when a sample is illuminated with a UV spectral band (e.g., in the range between 300 nm and 400 nm) selected from either the second or third output spectrum SP2, SP3 in FIG. 10, measurement data would be very sensitive to a small change in the spectrum. A small shift of the sharp spectral peak could lead to significant wavelength and/or intensity variations on the sample which in turn may result in unreliable measurement data (e.g., large measurement errors, lack of repeatability).

As described above, there are many nonlinear optical processes involved in generation of broadband output radiation ORD (e.g., supercontinuum or white light). Which nonlinear optical process has a more pronounced spectral broadening effect over the others will depend on how the operating parameters are set. For example, by selecting a pump wavelength and/or an optical fiber such that the pump pulse propagates through the fiber in a normal dispersion region (positive group velocity dispersion (GVD)), self-phase modulation is the dominant nonlinear optical process and is responsible for spectral expansion of the pump pulse. However in most cases, spectral broadening of input radiation IRD provided by the pulsed pump radiation source PRS is driven by soliton dynamics which require a pump pulse to propagate in an optical fiber OF in the anomalous dispersion region (negative GVD). This is because, in the anomalous dispersion region, the effects of Kerr nonlinearity and dispersion act in opposition to each other. When the pulse parameters of a pump pulse, which is launched into an optical fiber (e.g., HC-PCF) with anomalous chromatic dispersion, do not exactly match those of a soliton, the pump pulse will evolve into a soliton pulse with a certain soliton order and a dispersive wave.

It is known that soliton fission and modulation instability (MI) are the two primary mechanisms for spectral broadening in soliton driven broadband radiation generation. The distinction between the two mechanisms is that the soliton fission process is associated with low soliton orders whereas the MI process is associated with high soliton orders. MI is a physical process which refers to the spontaneous growth of spectral sidebands of a strong narrow-band (compared to the MI modulation frequency) pump pulse in a nonlinear dispersive medium. MI generally arises in the anomalous dispersion regime; however, it can also arise in the normal dispersion region if certain requirements are fulfilled, for example, high order dispersion is present. During the MI process, tiny perturbations present in the electric field (or envelope) of the pulse, e.g., due to quantum fluctuations, are amplified exponentially in the presence of Kerr nonlinearity. The amount of amplification is determined by the MI gain. During such a MI process, the temporal pulse envelope breaks into a plurality of short temporal sub-structures or fundamental solitons. In parallel to this, spectral side bands are created symmetrically at both sides of the peak pump wavelength resulting in a continuously broadening spectral profile.

The modulation frequency is expressed as:

$$\Delta\omega_{MI} = \sqrt{\frac{2\gamma P}{|\beta_2|}} \quad \text{Eq. [1]}$$

and the corresponding MI period is given by:

$$T_{MI} = 2\pi/\Delta\omega_{MI} = 2\pi/\sqrt{\frac{2\gamma P}{|\beta_2|}} \quad \text{Eq. [2]}$$

where γ denotes nonlinear coefficient, P denotes pump power, and $\beta_2$ denotes fiber propagation constant. For the MI process to dominate, the pump pulse should be sufficiently longer than the MI period $T_{MI}$. However, it is not possible to tell from the pump pulse duration alone whether the soliton fission process or the MI process will be the dominant mechanism for spectral expansion in broadband radiation generation. This is because the pump pulse duration scales with the pump peak power which affects the nonlinear coefficient and thus the modulation period.

For a given pump pulse with a pulse duration τ, the equivalent soliton order N is given by:

$$N = \sqrt{2}\,\pi\tau_0/T_{MI}. \quad \text{Eq. [3]}$$

In Eq. [1], for N=1, the soliton is the fundamental soliton. All other solitons with N>1, are high order solitons. As described above, for the MI process to be the dominant spectral broadening mechanism, the pump pulse needs to be sufficiently longer than the MI period $T_{MI}$ (or $\tau_0$>>$T_{MI}$). It has been found that spectral broadening is typically dominated by the MI process when N>>20 whereas spectral broadening is typically dominated by soliton fission when N<<20. Therefore, for arrangements which use the MI process, it is desirable to produce input radiation IRD with a high soliton order N. Furthermore, as can be seen from Eq. [3], the soliton order of the input radiation IRD is proportional to the pulse duration $\tau_0$ of the input radiation IRD. Therefore, for typical prior art arrangements where the MI process dominates, the pulse duration $\tau_0$ of the input radiation IRD typically ranges from 100 femtoseconds (fs) to 10 s of picoseconds (ps), and the pulse energy ranges from 1 microjoules (µJ) to 20 µJ.

It should be noted that other nonlinear optical processes such as for example Raman processes can also contribute to the nonlinear spectral expansion. Raman processes have a dependence on the type of the gas medium. For example, in the case where the broadband output radiation ORD is generated in a HC-ARF filled with a noble gas or gas mixture (e.g., argon, krypton, and/or xenon), MI is the dominant process for spectral broadening of a pump pulse while the Raman effect is absent. Similarly, in the case where the broadband output radiation ORD is generated in a HC-ARF filled with a Raman active gas or gas mixture (e.g., hydrogen, deuterium and/or nitrogen), MI is still the dominant process if the pump pulse is on the order of or shorter than the oscillation time of the dominant (i.e. higher gain) molecular oscillations, while the Raman effect is less dominant and results in a red-shift of the pump pulse spectral centroid. However, the Raman effect plays a dominant role when the pump pulse is longer than the oscillation time of the dominant Raman active modes. The Raman effect induces soliton self-frequency shift and soliton collisions. It has been found that the interplay between the Raman processes and the MI process can result in an extended long wavelength edge of the broadband output radiation ORD.

In addition to the initial pump launching process, dispersive waves can also be generated during subsequent nonlinear optical processes. For example, a dispersive wave can be formed when the soliton is disturbed by a localized loss in the fiber or by the transition into a fiber with modified parameters. When the generated dispersive waves are phase matched as well as spectrally overlapped with the soliton, the soliton energy will be partially transferred to the dispersive waves. Since dispersive waves are formed in the normal dispersion region having wavelengths shifted from the soliton, dispersive wave generation (DWG) can be utilized for the short wavelength extension. For efficient generation of dispersive waves, the soliton is desired to have a relatively broad spectrum and propagate close to the zero-dispersion wavelength of the optical fiber OF.

Referring back to FIG. 10, the sharp spectral peaks in both the second and third output spectra SP2, SP3 are predominantly resultant from DWG in an uncontrolled manner. Therefore, to extend the short wavelength edge of the broadband output radiation while maintaining a smooth spectral profile, it is proposed to better control the aforementioned various nonlinear optical processes. The proposed methods and devices aim to produce an output spectrum such as that of first output spectrum SP1. In particular such an output spectrum may be such that it does not vary by more than 75%, 50%, 40% or 30% (in terms of PSD) from an average over a broad wavelength range of interest e.g., a range comprises a lower bound between 10 nm and 400 nm and an upper bound between 1000 nm and 3000 nm, a range between 400 nm and 1000 nm, a range between 400 nm and 2000 nm, or a range between 200 nm and 2000 nm. Additionally or alternatively, such an output spectrum may be such that it does not comprise any peaks having a PSD more than 2×, 3×, 4× or 5× an average PSD for the spectrum.

In this disclosure, methods and apparatuses are proposed to overcome above-described problems associated with existing methods. The proposed methods and apparatuses which are embodied in the following examples are able to further extend the broadband output radiation ORD generated from a hollow core HC optical fiber OF based radiation source RDS into the UV region, while simultaneously maintaining a balanced spectral profile. This may be achieved by applying one or more waists or reduced cross-sectional width (e.g., diameter) regions to the hollow core HC optical fiber OF from which the broadband output radiation ORD is generated. The purpose of applying one or more waists to the hollow core HC optical fiber OF is to carefully manipulate one or more nonlinear optical processes, e.g., strength and onset of the MI process and DWG, in the fiber such that the short wavelength extension is attained in an effective and controlled manner.

Fiber tapering is known as a useful technique for modifying local properties of an optical fiber OF such that different optical characteristics can be obtained. Fiber tapers have found a wide range of applications such as optical communication and sensing. In those applications, fiber tapers are used for improving mode matching between optical waveguides, for providing mode filtering to higher-order guided modes, and for increasing nonlinearity. Since a fiber taper reduces the core cross-sectional width (e.g., diameter) as well as cladding cross-sectional width (e.g., diameter), the same pump pulse, when traversing the fiber taper, will have higher peak intensities and thus see higher nonlinearities in the more confined fiber taper. In the publication, T. A. Birks et al., "Supercontinuum generation in tapered fibers", Opt. Lett. 25 (19), 1415 (2000), fiber tapering was applied to increase the nonlinearity in a standard telecommunication fiber. The use of the tapered fiber allowed an unamplified pump pulse to be broadened to a spectrum more than two octaves broad.

A tapered fiber may comprise a waist region comprising a tapering-down section where the fiber cross-sectional width (e.g., diameter) is reduced, a central section of constant cross-sectional width (e.g., diameter) and a tapering-up section where the fiber cross-sectional width (e.g., diameter) is increased to the original cross-sectional width (e.g., diameter). The length of the taper waist region can extend from e.g., a few millimeters to several tens of centimeters. The taper waist region with a longer length of e.g., 10 s of meters, may be possible if the fiber parameters are varied during fiber drawing. Typically, tapered fibers are fabricated by heating a fiber (e.g., scanning a heat source or oxy-butane flame along the length of a fiber) while gently applying a pulling force at both ends. Precise control of the extension of the heated area during the elongation process allows production of arbitrary taper profiles and waist lengths. The publication, R. Pennetta et al., "Fabrication and non-destructive characterization of tapered single-ring hollow-core photonic crystal fiber," APL Photonics 4, 056105 (2019), discloses that single-ring HC-PCF can be tapered using the standard flame brush technique by selectively evacuating the regions outside the capillaries so as to balance surface tension. In the following embodiments, hollow core HC optical fibers OF may be tapered in an adiabatic manner such that propagation of the fundamental mode is substantially maintained through the tapered fiber.

Although higher nonlinearities are beneficial for enhancing spectral broadening effect, there, however, has been identified a limit in power scalability, above which the broadband radiation (e.g., supercontinuum) generation process in a tapered hollow core HC optical fiber OF becomes unstable. The unstable supercontinuum generation is manifested by power and spectrum instabilities. To prevent power instabilities, it is desirable to optimize fiber tapers to give the desired spectrum with low pump pulse energies.

FIG. 11 schematically illustrates two examples of single-waisted hollow core optical fibers configured for generation of broadband output radiation with a smooth spectral profile and an extended short wavelength edge. The single-waisted hollow core optical fiber may comprise a single tapered waist region TP, TP'.

Figure 11A:
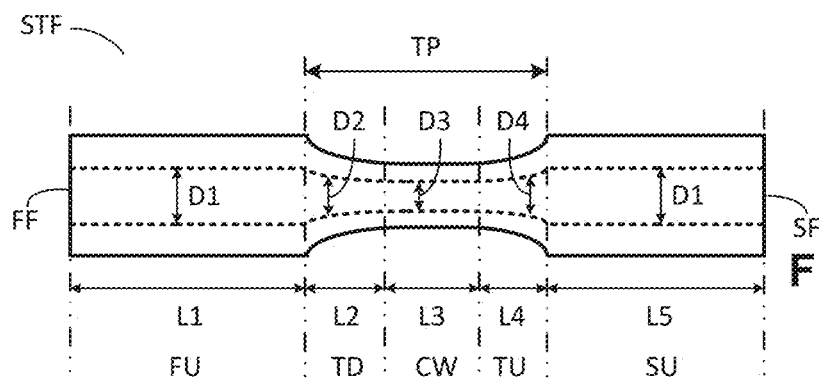
FIG. 11(a) schematically depicts a single-waisted hollow core optical fiber configured for generation of broadband output radiation with a smooth spectral profile and an extended short wavelength edge.

In some embodiments, as illustrated in FIG. 11(a), the waist region may comprise a central region having substantially constant cross-sectional width (e.g., diameter) between tapered regions. As such, the single-waisted hollow core optical fiber STF may comprise five sections: a first un-tapered section FU, a tapering-down section TD, a central waist section CW (having a substantially or relatively constant cross-sectional width), a tapering-up section TU, and a second un-tapered section SU. Thus, the single waist region or reduced cross-sectional width (e.g., diameter) region may be regarded as a fiber portion comprising the tapering-down section TD, the central waist section CW, and the tapering-up section TU.

For each section, there may be a corresponding set of parameters defining e.g., the section length, core cross-sectional width (e.g., diameter), and capillary cross-sectional width (e.g., diameter). Specifically, the first un-tapered section FU may comprise a first length L1, a first core cross-sectional width D1, and a first capillary cross-sectional width (not shown); the tapering-down section TD may comprise a second length L2, a second core cross-sectional width D2 varying (or reducing) along the tapering-down section, and a second capillary cross-sectional width (not shown) varying (or reducing) along the tapering-down section; the central waist section CW may comprise a third length L3, a third core cross-sectional width D3, and a third capillary cross-sectional width (not shown); the tapering-up section TU may comprise a fourth length L4, a fourth core cross-sectional width D4, and a fourth capillary cross-sectional width (not shown); and the second un-tapered section SU may comprise a fifth length L5, the first core cross-sectional width D1, and the first capillary cross-sectional width (not shown). At the location where the tapering-down section TD and the central waist section CW meet, the second core cross-sectional width D2 may be the same as the third core cross-sectional width D3; and the second capillary core cross-sectional width may be the same as the third capillary core cross-sectional width. Likewise, at the location where the central waist section CW and the tapering-up section TU meet, the third core cross-sectional width D3 may be the same as the fourth core cross-sectional width D4; and the second capillary core cross-sectional width may be the same as the fourth capillary core cross-sectional width.

Note that, the above-mentioned fiber parameters are example parameters which may be appropriate specifically for a tapered single-ring HC-ARF. Other different types of optical fibers may comprise different or additional fiber parameters. For example, in some embodiments, the optical fiber may comprise a different type of HC-ARF such as a Kagome fiber, the cladding structure of which comprises a set of concentric hexagonal annuli. In such a case, the capillary cross-sectional width described above may be replaced with a distance between two opposing edges of a hexagonal annulus.

Figure 11B:
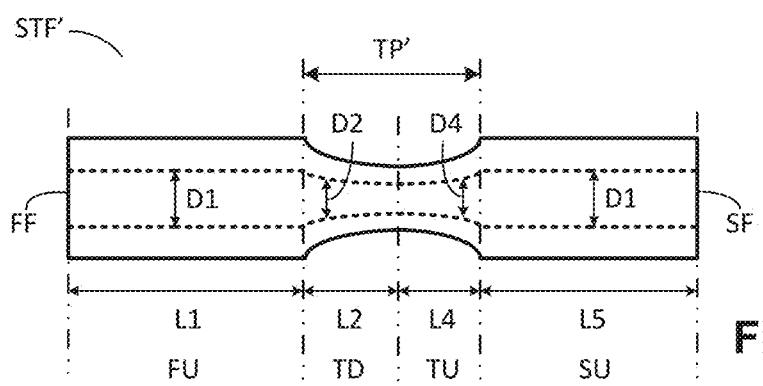
FIG. 11(b) schematically depicts another configuration of a single-waisted hollow core optical fiber wherein the single waist region comprises no central waist section.

Note that the central waist section CW may not be necessary for a tapered optical fiber or a taper. In some embodiments, an optical fiber may be tapered in a way such that the tapering-down section TD is immediately followed by the tapering-up section TU. As such, the tapered optical fiber may have no central waist section CW, or the central waist section CW may be significantly short such that it can be treated as effectively non-existent. FIG. 11(b) schematically illustrates another configuration of the single-waisted hollow core optical fiber wherein the single waist region TP' may comprise no central waist section. The optical fiber OF used in the embodiment of FIG. 11(b) may be the same as that in the embodiment of FIG. 11(a). The main difference may be that the single waist TP' of the tapered optical fiber STF' shown in FIG. 11(b) does not comprise the central waist section CW. At the location where the tapering-down section TD and the tapering-up section TU meet (or taper waist location), the second core cross-sectional width D2 may be the same as the fourth core cross-sectional width D4; and the second capillary core cross-sectional width (not shown) may be the same as the fourth core cross-sectional width (not shown). It should also be appreciated that one or more other sections of the single-waisted hollow core optical fiber STF may be precluded. For example, in other embodiments, a single-waisted hollow core optical fiber may comprise no tapering-up section TU nor any second un-tapered section SU. In different embodiments, a single-waisted hollow core optical fiber may comprise no first un-tapered section FU nor any tapering-down section TD.

In the tapering-down section TD, the structural dimensions of the fiber may gradually and continuously decrease along the axial direction or the length of the single-waisted hollow core optical fiber STF, STF'. For example, the first core cross-sectional width D1 and first capillary cross-sectional width may gradually decrease to the second core cross-sectional width D2 and the second capillary cross-sectional width, respectively. Similarly, in the tapering-up section TU, the structural dimensions of the fiber may gradually and continuously reduce along the axial direction or the length of the single-waisted hollow core optical fiber SFT, STF'. For example, the fourth core cross-sectional width D4 and fourth capillary cross-sectional width may gradually and continuously increase to the first core cross-sectional width D1 and first capillary cross-sectional width, respectively. The rate at which the structural dimensions, e.g., the core cross-sectional width, decrease or increase may depend on the tapering process, e.g., the rate at which the fiber is pulled during tapering.

The first un-tapered section FU may be the input end of the tapered hollow optical fiber STF, STF' and the second un-tapered section SU may be the output end of the tapered optical fiber STF, STF'. The first un-tapered section FU may comprise a first fiber facet FF and the second un-tapered section SU may comprise a second fiber facet SF. Referring back to FIG. 8, in operation, the tapered optical fiber STF, STF' may be fully enclosed by the reservoir RSV filled with a suitable medium such as a noble gas or a noble gas dominated gas mixture WM. After entering the reservoir RSV, the input pump pulses emitted from the pulsed pump radiation source PRS may be coupled into the first un-tapered section FU through the first fiber facet FF; the generated broadband output radiation ORD may subsequently exit the second un-tapered section SU through the second fiber facet SF. It should be appreciated that the configuration in FIG. 8 is only an example. In different configurations, the tapered fiber may only be partially enclosed by the reservoir RSV. In other configurations, the reservoir RSV in FIG. 8 may not be used. For example, the hollow core of the tapered optical fiber STF, STF' may be first filled with a noble gas or a noble gas dominated gas mixture WM. Subsequently the gas-filled hollow core HC may be sealed for example by attaching an optical mirror to each fiber facet, e.g., the first fiber facet FF and the second fiber facet SF. As such, the use of a reservoir RSV can be precluded.

In some embodiments, the un-tapered or uniform optical fiber OF may comprise one of the aforementioned HC-PCFs, e.g., a single ring HC-ARF as illustrated in FIG. 7. When used for generation of broadband output radiation ORD, the single-waisted hollow core optical fiber STF, STF' may be comprised in a broadband radiation source RDS shown in FIG. 8. In some embodiments, the single-waisted hollow core optical fiber STF, STF' may be filled with a noble gas or a noble gas dominated mixture. As described above, a noble gas or a noble gas dominated mixture may allow the MI process to be the dominant nonlinear optical process for spectral broadening.

Figure 12A:
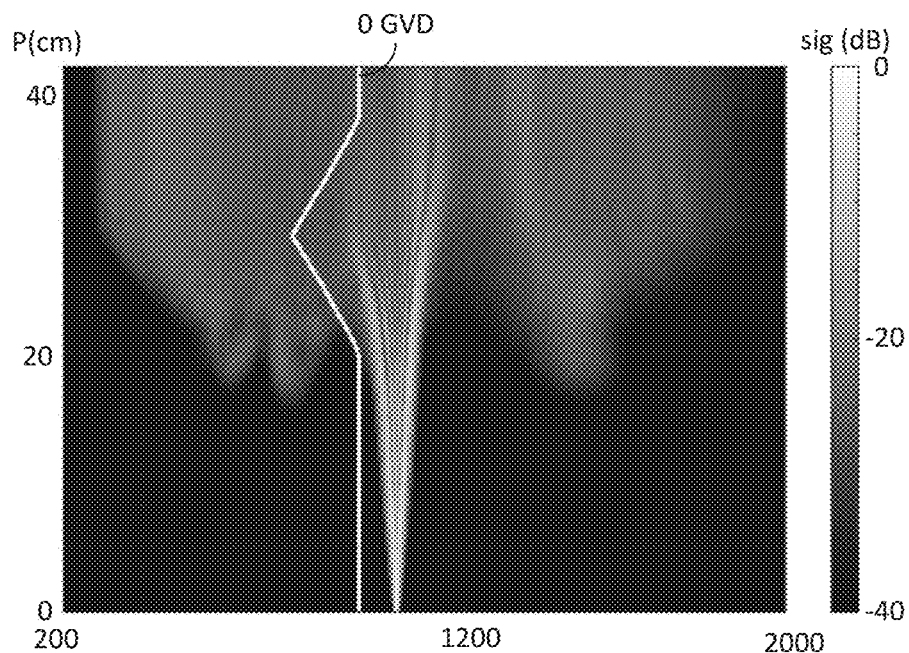
FIG. 12(a) shows a wavelength λ-energy (or signal sig (dB)) spectral density plot against position P along the fiber length for a simulation, describing the spectral evolution of a pulse of input radiation within a single-waisted hollow core optical fiber (e.g., as shown in FIG. 11(b)) comprising a waist region which begins (e.g., the tapering down section begins) at an optimized location along the fiber length.

FIG. 12(a) shows a wavelength λ-energy (or signal sig (dB)) spectral density plot against position P along the fiber length for a simulation, describing the spectral evolution of a pulse of input radiation within a single-waisted hollow core optical fiber (e.g., as shown in FIG. 11(b)) comprising a waist region which begins (e.g., the tapering down section begins) at an optimized location along the fiber length. The optimized location may be where the MI dominated spectral broadening has already begun. The single-waisted hollow core optical fiber may be comprised within a radiation source such as shown in FIG. 8, for example. The white line 0 GVD indicates the wavelength at which group velocity dispersion is zero. Since the zero dispersion wavelength changes with the local fiber core cross-sectional width (e.g., a shorter zero dispersion wavelength corresponds to a smaller core cross-sectional width), the white line 0 GVD also indicates the change of the fiber core cross-sectional width (e.g., diameter) along the length of the single-waisted hollow core optical fiber STF'. In this specific example simulation, the total length of the single-waisted hollow core optical fiber STF' is 42 cm. The lengths of the first un-tapered section FU, the tapering-down section TD, the tapering-up section TU and the second un-tapered section SU are 20 cm, 9 cm, 9 cm and 4 cm, respectively. The diameter of the hollow core in un-tapered sections FU, SU is 30 μm and the minimum diameter of the hollow core (or taper waist diameter) at the location where the tapering-down section and the tapering-up section meet is 20 μm. In the simulation, the diameter of the hollow core in the tapering-down section TD is treated as decreasing linearly from 30 μm to 20 μm and the diameter of the hollow core in the tapering-up section TU is treated as increasing linearly from 20 μm to 30 μm (this is for simplicity in the simulation; due to the manufacturing process, it is unlikely that the tapers will have a linearly varying diameter).

The hollow core of the single-waisted hollow core optical fiber STF' may be filled with a working medium of krypton gas at a pressure of 25.7 bar. The input radiation may comprise a train of pump pulses with a repetition rate of 5 MHz and a centroid wavelength of 1030 nm. The full width half maximum (FWHM) pulse duration may be 300 fs and the pulse energy may be 5.3 μJ. Upon launching into the single-waisted hollow core optical fiber STF', the pulsed input radiation (or the pump pulse) IRD evolves into a high order soliton with a soliton order of N=110. Since the soliton order changes with the core diameter, the initial soliton order reduces to N=75 when the core diameter reduces to 20 μm. As described above, the soliton order of the pump pulse is a convenient parameter that can be used to distinguish conditions under which spectral broadening is dominated by MI and conditions under which spectral broadening is dominated by soliton fission. Since the soliton order is much higher than 20 which is considered as the lower limit of the MI process, the spectral broadening observed in the first un-tapered section FU (or the first 20 cm length of the single-waisted hollow core optical fiber STF') is therefore predominantly attributed to the MI process.

As shown in FIG. 12(a), the onset of the MI process occurs at a distance of approximately 13 cm from the first fiber facet FF of the single-waisted hollow core optical fiber STF'. The MI process causes a significant spectral expansion which pushes the long wavelength edge to about 1600 nm and the short wavelength edge to about 500 nm. When the spectrally expanded pulse enters into the tapering-down section (i.e. at a distance of 20 cm from the first fiber facet FF), the shrinking core cross-sectional width alters the previously established conditions of the nonlinear optical processes which facilitate efficient generation of the wavelength-shifted dispersive waves. Consequently, an additional short wavelength extension is obtained. This additional short wavelength extension is evident in FIG. 12(a) where the short wavelength edge of the spectrum is extended from about 500 nm at the distance of 20 cm from the first fiber facet FF to below 300 nm at the distance of 28 cm from the first fiber facet FF. The maximum short wavelength extension is achieved around the taper waist location or the location where the tapering-down section TD and the tapering-up section TU meets.

The location of the taper, defined as the location at which the tapering down starts, is significant for simultaneously obtaining a maximized short wavelength extension and a smooth overall spectral profile, such as the example spectral profile shown in FIG. 12(a). In cases of a single-waisted hollow core optical fiber STF, STF', the taper location may be precisely determined via simulation. Alternatively or additionally, the taper location may be determined using a cutback method which may comprise for example the following four steps: step 1), measuring the output spectrum and power at a (e.g., long) length of an un-tapered hollow core optical fiber; step 2), cutting the un-tapered fiber at a point near the input end to obtain a shortened length; step 3), performing the same measurements on the shortened length of the un-tapered fiber; and step 4) repeating steps 2) to 3) until the measured output spectrum confirms that the MI dominated spectral broadening has occurred. The corresponding residual length of the un-tapered fiber may be used to set the length of the first un-tapered section FU of the single-waisted hollow core optical fiber STF, STF'. Accordingly, the single taper, or more specifically the tapering-down section TD, may start immediately after the determined length.

It should be appreciated that different sets of operating parameters (e.g., parameters of the input radiation IRD, the optical fiber OF, the working medium WM, etc.) may lead to different nonlinear conditions and therefore may require different taper parameters (e.g., taper location, tapering rate, taper waist, etc.). For example, with a different set of operating parameters, the single-waisted hollow core optical fiber STF of FIG. 11(a) which comprises an additional central waist section CW may be used to obtain a smooth and extended spectral profile. The central waist section CW may further enhance the nonlinearity seen by the propagating pulse (due to its smaller core cross-sectional width) and therefore may improve the efficiency of the DWG.

A hollow core optical fiber tapered with a single taper is an effective approach for generating broadband output radiation ORD with a smooth and UV-extended spectral profile. However, a primary function of the single taper is to control the onset of the DWG. There is no control over the onset of the MI process which is predominantly enabled by providing a sufficient length of the first un-tapered section FU. If the length of the first un-tapered section FU is insufficiently long for a given set of operating parameters, the resultant output spectrum will not have the desired spectral profile.

Figure 12B:
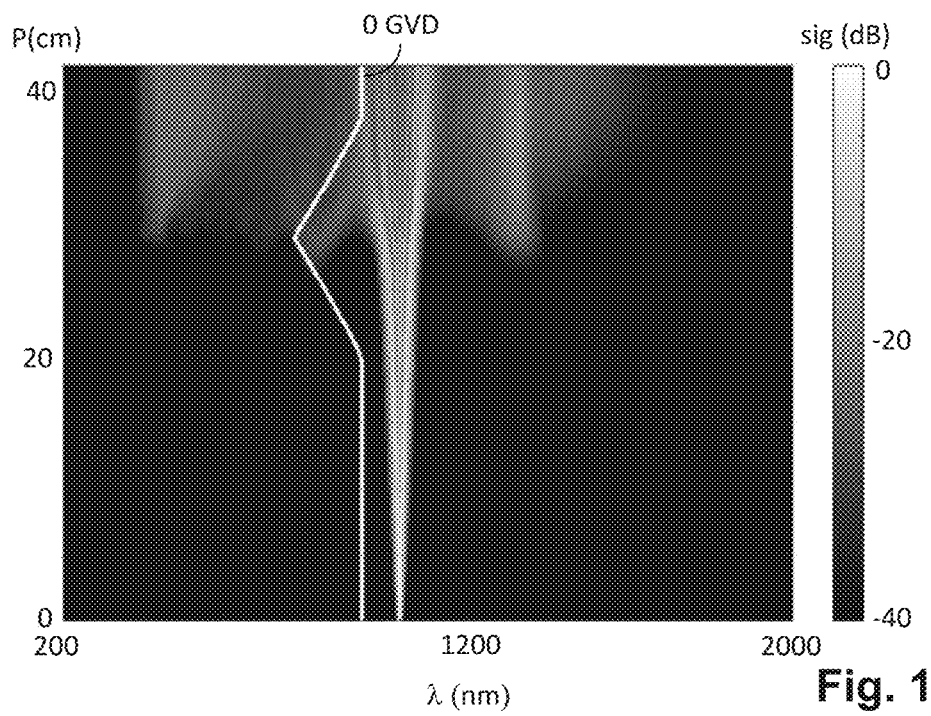
FIG. 12(b) shows an equivalent plot to that of FIG. 12(a) for a simulation of the spectral evolution of a pulse of radiation within the single-waisted hollow core optical fiber (e.g., as shown in FIG. 11(b)) when the waist region is at an un-optimized location, i.e., where MI dominated spectral broadening begins at the taper.

FIG. 12(b) shows an equivalent plot to that of FIG. 12(a) for a simulation of the spectral evolution of a pulse of radiation within the single-waisted hollow core optical fiber shown in FIG. 11(b) when the single waist region is at an un-optimized location; i.e., where the MI dominated spectral broadening begins at the taper. The simulation shown in FIG. 12(b) is based on the same tapered hollow core optical fiber as that used in the simulation shown in FIG. 12(a). The main difference between the two simulations is that the pulse energy of the input radiation IRD in the simulation of FIG. 12(b) is 2.4 µJ rather than 5.3 µJ. The same length of the first un-tapered section FU is now not sufficient to trigger the onset of the MI process due to the lower pulse energy. As shown in FIG. 12(b), the onset of the MI dominated spectral broadening is delayed until the pulse has entered the tapering region, e.g., the tapering-down section TD and the tapering-up section TU. In this example simulation, the delayed MI process prevents the DWG from occurring and thus results in an output spectrum having a peaky profile and lacking the short wavelength extension.

Figure 13:
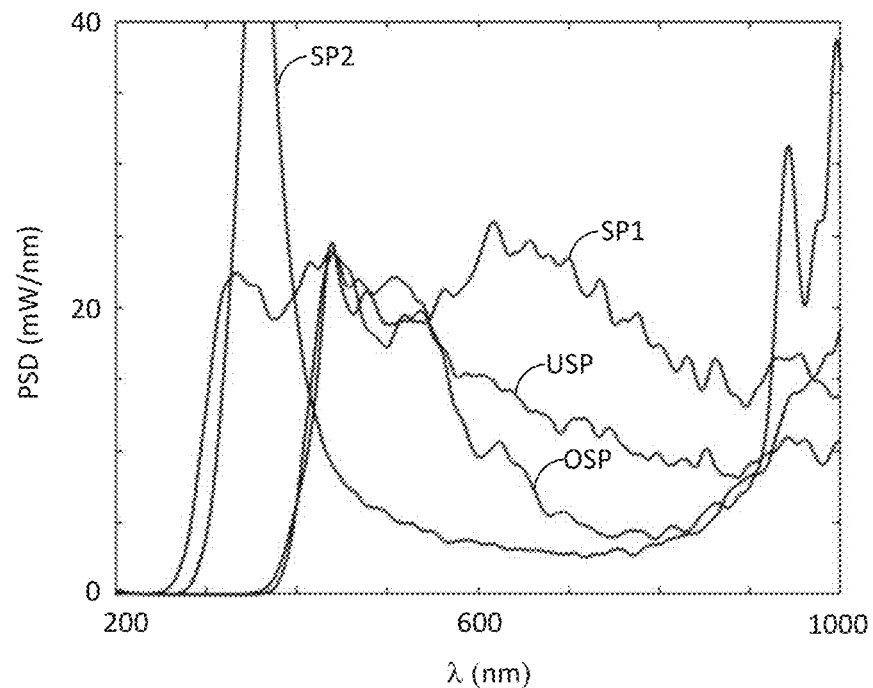
FIG. 13 shows a simulation of two output spectra of the radiation source with the same parameters as the simulation shown in FIGS. 12(a) and 12(b), respectively.

FIG. 13 shows a simulation of the two output spectra of the radiation source with the same parameters as the simulation shown in FIGS. 12(a) and 12(b), respectively. The un-optimized output spectrum USP generated from the radiation source wherein the hollow core fiber is tapered at an un-optimized location comprises a similar spectral bandwidth as that of the first output spectrum SP1 (generated from the same but uniform optical fiber) and two pronounced sharp peaks, e.g., one around 450 nm and the other around 1000 nm, similar to the second output spectrum SP2. Such a spectral profile is not favorable for metrology applications. By comparison, the output spectrum OSP generated from the radiation source wherein the hollow core fiber is tapered at an optimized location comprises an extended short wavelength edge and a smoother spectral profile (or a more balanced PSD profile).

Figure 14A:
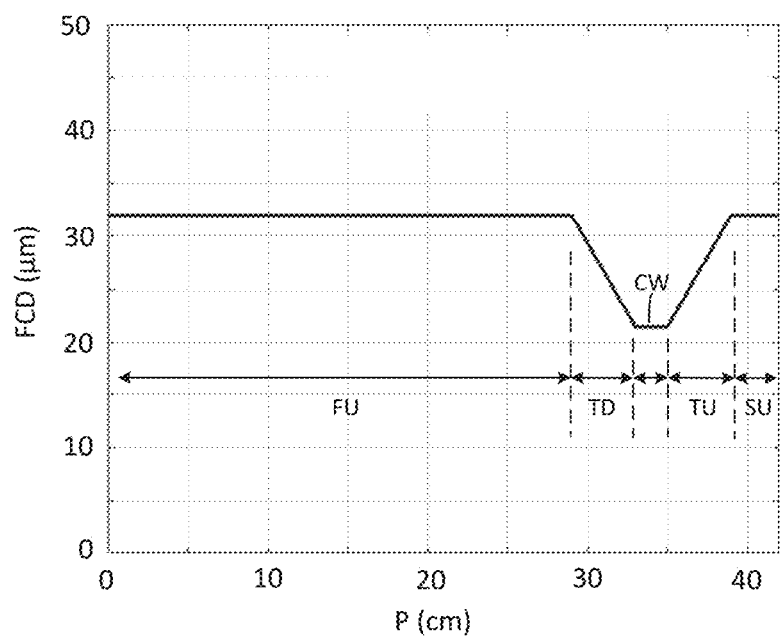
FIG. 14(a) schematically depicts how fiber core diameter varies along the length of an example single-waisted hollow core optical fiber optimized via simulation for short wavelength extension and a balanced spectral profile of the output radiation.

FIG. 14(a) schematically depicts an example of how fiber core cross-sectional width (e.g., diameter) varies along the length of an example single-waisted hollow core optical fiber optimized via simulation for short wavelength extension and maintenance of a balanced spectral profile of the output radiation ORD. Note that the fiber design shown in the Figure is only one specific example of the hollow core optical fiber STF shown in FIG. 11(a). Note also that the fiber design is used as a target for manufacturing the fiber; hence, the final or post-production fiber dimensions (e.g., dimensions of the waist region comprising the tapering-down section TD, the central waist section CW, and the tapering-up section TU) may slightly deviate from the designed values within a manufacturing tolerance range. It will be appreciated that the size of the manufacturing tolerance range will depend on many factors, such as the way the fiber is tapered, the tools that are used for such fiber tapering, etc. The manufacturing tolerance range for making a single-waisted hollow core optical fiber according to the design of FIG. 14(a) may be about ±5%, about ±10%, about ±15%, or about ±20% of each target dimension.

Referring back to FIG. 14(a), in this example design, the first un-tapered section FU, the tapering-down section TD, the tapering-up section TP and the second un-tapered section SU have lengths of about 29 cm, about 4 cm, about 2 cm, about 4 cm and about 3 cm, respectively. The fiber core diameter FCD in either the first un-tapered section FU or the second un-tapered section SU is about 32 µm. The fiber core diameter FCD changes substantially linearly along the fiber length in either the tapering-down section TD or the tapering-up section TU. The fiber core diameter FCD in the central waist section CW is about 21.5 µm. In this case, the tapering ratio, which is defined as the ratio of the fiber core diameter FCD of the central waist section CW over that of the first or second un-tapered section FU or SU, is calculated to be around 0.67. The length (about 29 cm in this case) of the first un-tapered section FU is purposely chosen to ensure that for a given set of operating parameters, the pump pulse has undergone the MI dominated spectral broadening prior to entering into the waist region of the fiber.

Figure 14B:
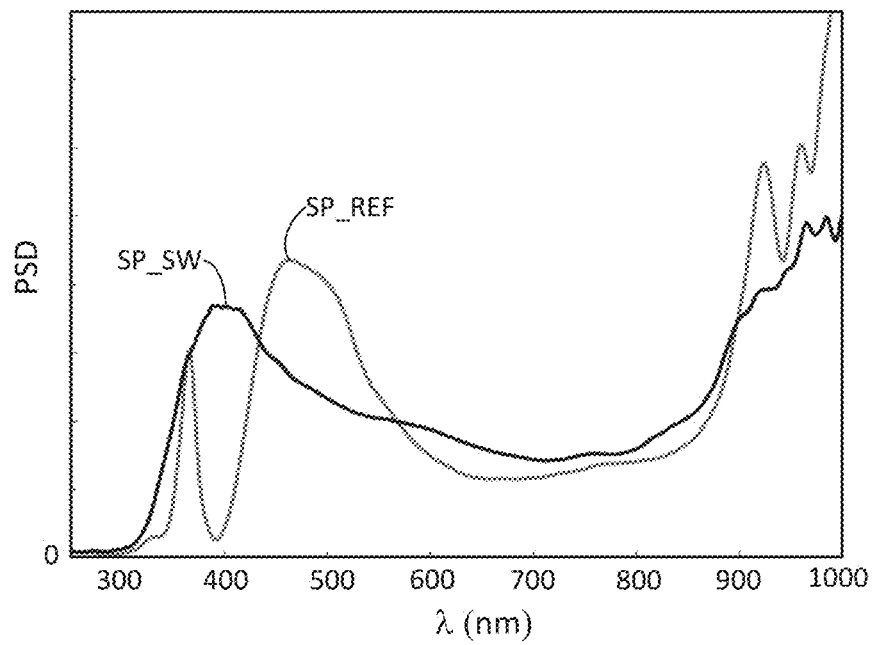
FIG. 14(b) shows two measured output spectra emitted respectively from an un-tapered hollow core optical fiber and a single-waisted hollow core optical fiber (e.g., as shown in FIG. 14(a))

FIG. 14(b) shows two measured output spectra SP_REF, SP_SW respectively emitted from a uniform hollow core optical fiber and a single-waisted hollow core optical fiber (e.g., as shown in FIG. 14(a)). Spectrum SP_REF corresponds to a baseline situation where a set of operating parameters was carefully selected for a given hollow core optical fiber. In this particular experiment, the uniform fiber was a single ring HC-ARF (e.g., as illustrated in FIG. 7) with a core diameter of 32 µm. The working medium WM that filled the hollow core of the uniform fiber was a gas mixture consisting of 98% argon and 2% hydrogen in mole fractions. The pressure of the working medium WM was set to 40 bar. The pulsed pump radiation PRS emitted a train of pump pulses with a repetition rate of 1 MHz. The pump pulses had a centroid wavelength of about 1030 nm, a pulse duration of about 300 fs and a pulse energy of about 4.16 µJ. As can be seen in the Figure, the baseline spectrum has a very peaky (or not smooth/flat) spectral profile, particularly in the wavelength range between 300 and 600 nm. Such a peaky spectral profile prevents it from being of any practical use.

By comparison, spectrum SP_SW was generated from a tapered hollow core optical fiber which was made from the same uniform fiber (or a different fiber with the same design) as used for producing spectrum SP_REF and was post-processed (i.e. tapered) to the design shown in FIG. 14(a). To fine-tune the output spectrum so as to balance the short wavelength extension and the spectral shape, the pump pulse energy was adjusted, e.g., increased from 4.16 µJ to 5.36 µJ, while other operating parameters were kept the same. It is apparent from the comparison that the implementation of the single waist region (or the single taper) not only further extends the short wavelength edge (e.g., from about 350 nm to 300 nm) but also significantly smoothens the original peaky spectral profile, in particular in the wavelength range between 300 and 600 nm (e.g., the trough region around 400 nm is no longer present).

Figure 14C:
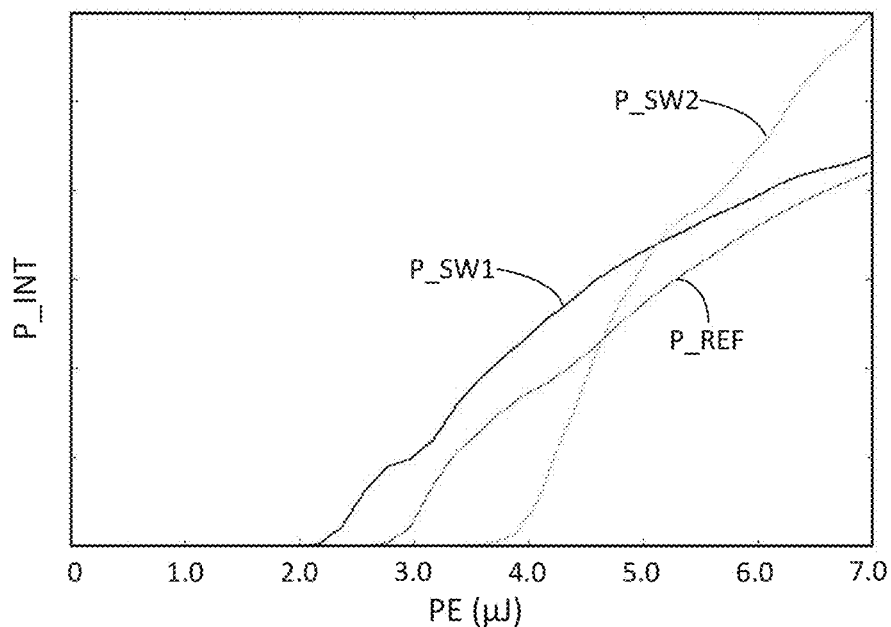
FIG. 14(c) shows three measured power transfer curves describing how integrated output power changes with input pump pulse energy for different hollow core optical fibers (e.g., a uniform hollow core optical fiber and a tapered hollow core optical fiber) and under different operating conditions (e.g., different pump pulse repetition rates)

FIG. 14(c) shows three measured power transfer curves P_REF, P_SW1, P_SW2 describing how integrated output power changes with input pump pulse energy for different hollow core optical fibers and under different operating conditions. Specifically, power transfer curve P_REF was obtained based on the same uniform hollow core optical fiber and the same operating parameters (except the input pump pulse energy which was deliberately varied in this measurement) as those used for generating spectrum SP_REF shown in FIG. 14(b). Similarly, power transfer curve P_SW1 was obtained based on the same tapered hollow core optical fiber and the same operating parameters (except the input pump pulse energy which was deliberately varied in this measurement) as those used for generating spectrum SP_SW shown in FIG. 14(b). Power transfer curve P_SW2 was obtained based on the same tapered hollow core optical fiber and the same operating parameters (except the pump pulse repetition rate which was increased from 1 MHz to 2 MHz) as those used for generating power transfer curve P_SW1.

Here, the integrated output power is the power integrated over either a certain wavelength range of or the entire spectral bandwidth of the output radiation ORD emitted from the fiber. As can be seen in the Figure, for all three power transfer curves P_REF, P_SW1, P_SW2, the output power increases as the input pump pulse energy increases without significant rolling over at the high energy end. This confirms that at least up to the pulse energy of around 7 µJ, the implementation of the single waist region (or single taper) causes none or negligible negative impact on the energy scaling capability of the radiation source RDS in which the single-waisted hollow core optical fiber is used for broadband radiation generation. The comparison between power transfer curves P_REF and P_SW1 demonstrates that with the same pump pulse repetition rate (e.g., 1 MHz), the single-waisted hollow core optical fiber leads to a lower pump energy threshold for generating the output radiation ORD than the uniform hollow core optical fiber. Moreover, the comparison between the power transfer curves P_SW1 and P_SW2 demonstrates that a higher pump pulse repetition rate results in a higher pump energy threshold and a higher slope efficiency which is the slope of the curve.

According to the simulation shown in FIG. 12(b), fiber tapering is helpful in triggering the onset of the MI process. Therefore, rather than relying on the MI process being passively triggered in the first un-tapered section FU, an additional waist region or reduced cross-sectional width region may be applied to the single-waisted hollow core optical fiber STF, STF' so as to better provide an active control over the MI process (e.g., the onset of the MI process). The use of the additional waist region may be advantageous in allowing the MI dominated spectral expansion to begin even with low pulse energies. As such, the aforementioned power and spectrum instabilities associated with high pulse energies can be circumvented.

Figure 15:
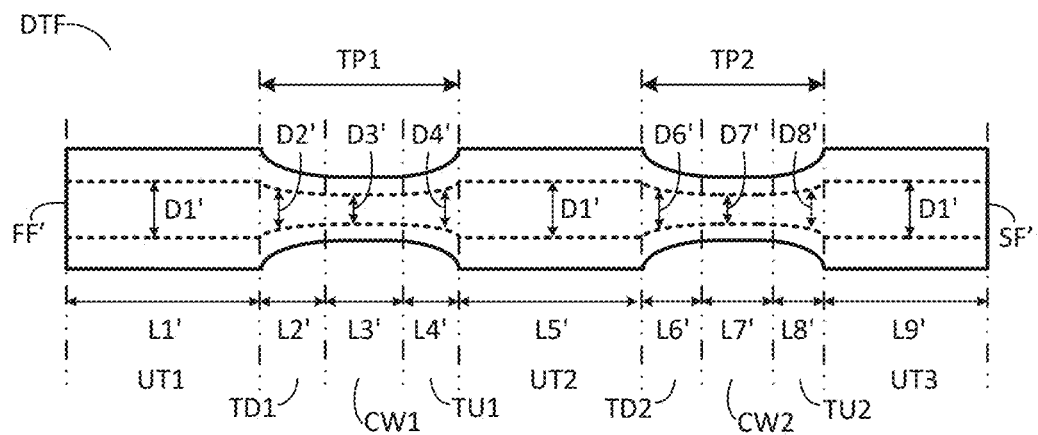
FIG. 15 schematically depicts a double-waisted hollow core optical fiber configured for generation of broadband output radiation with a smooth spectral profile and an extended short wavelength edge.

FIG. 15 schematically illustrates a double-waisted hollow core optical fiber configured for generation of broadband output radiation with a smooth spectral profile and an extended short wavelength edge. The double-waisted hollow core optical fiber DTF may comprise first waist region or reduced cross-sectional width region TP1 and second waist region or reduced cross-sectional width region TP2 located respectively at two different locations along the fiber.

Each of the two tapers may be configured either as the single taper shown in FIG. 11(a) (i.e. as illustrated here comprising the central waist section), the single taper shown in FIG. 11(b) (i.e. without the central waist section) or a combination of these (e.g., the first waist region may have a central waist section and the second waist region may comprise no central waist section or vice versa). In some embodiments, the un-tapered hollow core optical fiber may comprise one of the aforementioned HC-PCFs, e.g., a single ring HC-ARF as illustrated in FIG. 7. When used for generation of broadband output radiation ORD, the double-waisted hollow core optical fiber DTF shown in FIG. 15 may be comprised in the radiation source RDS shown in FIG. 8. The double-waisted hollow core optical fiber DTF may be filled with a noble gas or a noble gas dominated mixture. As described above, a noble gas or a noble gas dominated mixture may allow the MI process to be the dominant nonlinear optical process for spectral broadening.

In the embodiment of FIG. 15, the double-waisted hollow core optical fiber DTF may comprise nine sections: a first un-tapered section UT1, a first tapering-down section TD1, a first central waist section CW1, a first tapering-up section TU1, a second un-tapered section UT2, a second tapering-down section TD2, a second central waist section CW2, a second tapering-up section TU1 and a third un-tapered section UT3. For each section, there may exist a set of parameters defining e.g., the section length, core cross-sectional width, and capillary cross-sectional width. Specifically, the first un-tapered section UT1 may comprise a first length L1', a first core cross-sectional width D1', and a first capillary cross-sectional width (not shown); the first tapering-down section TD1 may comprise a second length L2', a second core cross-sectional width D2' varying (or reducing) along the tapering-down section, and a second capillary cross-sectional width (not shown) varying (or reducing) along the tapering-down section; the first central waist section CW1 may comprise a third length L3', a third core cross-sectional width D3', and a third capillary cross-sectional width (not shown); the first tapering-up section TU1 may comprise a fourth length L4', a fourth core cross-sectional width D4', and a fourth capillary cross-sectional width (not shown); the second un-tapered section UT2 may comprise a fifth length L5', the first core cross-sectional width D1', and the first capillary cross-sectional width; the second tapering-down section TD2 may comprise a sixth length L6', a sixth core cross-sectional width D6', and a sixth capillary cross-sectional width (not shown); the second central waist section CW2 may comprise a seventh length L7', a seventh core cross-sectional width D7', and a seventh capillary cross-sectional width (not shown); the second tapering-up section may comprise a eighth length L8', an eighth core cross-sectional width D8', and an eighth capillary cross-sectional width (not shown); and the third un-tapered section UT3 may comprise a ninth length L99, the first core cross-sectional width D1', and the first capillary cross-sectional width. In different embodiments, the double-waisted hollow core optical fiber DTF may comprise one of the two central waist sections TW1, TW2. In other embodiments, the double-waisted hollow core optical fiber DTF may comprise no central waist sections.

In some embodiments, the two tapers TP1, TP2 may be configured such that the first taper TP1 near the first fiber facet FF' is used to trigger the onset of the MI process while the second taper TP2 located downstream of the first taper TP1 and near the second fiber facet SF' is configured to trigger the onset of the DWG. The term "downstream" will describe a location nearer to an output end of the fiber, and "upstream" will describe a location nearer to an input end of the fiber. The aforementioned configurations of the radiation source RDS that can be applicable for the single-waisted hollow core optical fiber STF, STF' are equally applicable for the double-waisted hollow core optical fiber DTF.

Figure 16A:
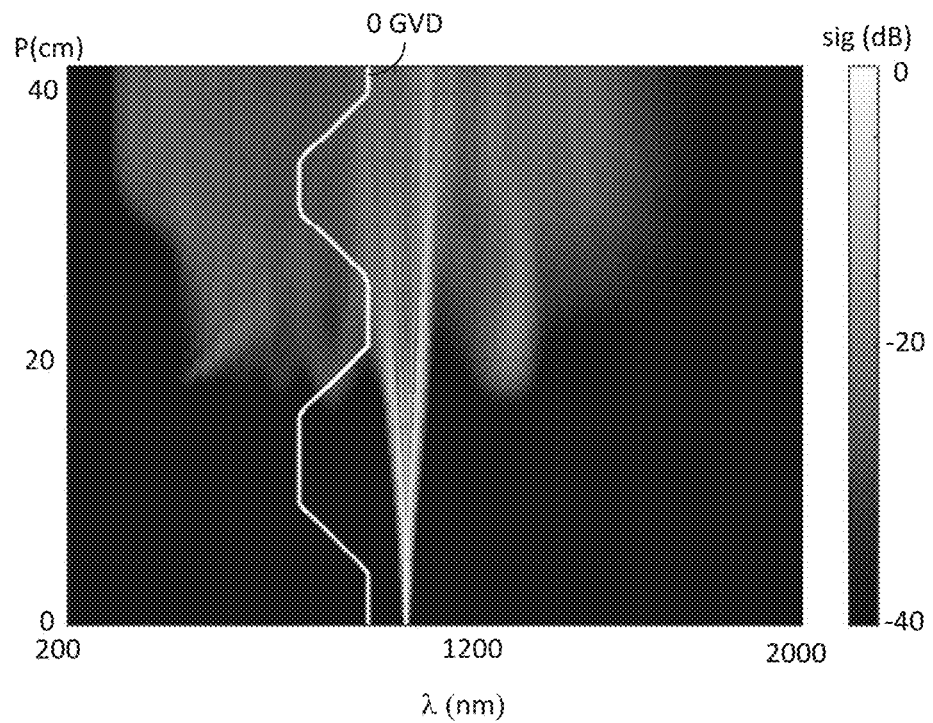
FIG. 16(a) shows an equivalent plot to those of FIG. 12 for a simulation of the spectral evolution of a pulse of radiation within a tapered hollow core optical fiber having two waist regions (e.g., as shown in FIG. 15) wherein the first waist region is applied to control the modulation instability process and the second waist region is applied to control dispersive wave generation.

FIG. 16(a) shows an equivalent plot to those of FIG. 12 for a simulation of the spectral evolution of a pulse of radiation within a tapered hollow core optical fiber shown having two waist regions (e.g., as shown in FIG. 15) wherein the first waist region is applied to control the modulation instability process and the second waist region is applied to control dispersive wave generation. The white line 0 GVD indicates the zero dispersion wavelength and the change of the fiber core cross-sectional width along the length of the double-waisted hollow core optical fiber DTF. In this example simulation, the total length of the double-waisted hollow core optical fiber DTF is 42 cm, e.g., the same as that of the single-waisted hollow core optical fiber STF, STF' shown in FIGS. 11(a) and 11(b). The lengths of the first un-tapered section UT1, the first tapering-down section TD1, the first tapering-up section TU1, the second un-tapered section UT2, the second tapering-down section TD2, the second central waist section CW2, the second tapering-up section TU2, and the third un-tapered section UT3 are 4 cm, 5 cm, 7 cm, 5 cm, 5 cm, 5 cm, 4 cm, 5 cm and 2 cm, respectively. The diameter of the hollow core in un-tapered sections UT1, UT2, UT3 is 30 μm and the minimum diameter of the hollow core (or taper waist diameter) in both the first central waist section CW1 and the second central waist section CW2 is 20 μm. In the simulation, the diameter of the hollow core in the tapering-down sections TD1, TD2 is treated as decreasing linearly from 30 μm to 20 μm and the diameter of the hollow core in the tapering-up section TU1, TU2 is treated as increasing linearly from 20 μm to 30 μm.

The hollow core of the double-waisted hollow core optical fiber DTF may be filled with a working medium of krypton gas at a pressure of 25.7 bar. The input radiation may comprise a train of pump pulses with a repetition rate of 10.6 MHz and a centroid wavelength of 1030 nm. The full width half maximum (FWHM) pulse duration is 300 fs and the pulse energy is 2.4 N. Upon launching into the double-waisted hollow core optical fiber DTF, the pulsed input radiation (or the pump pulse) IRD evolves into a high order soliton with a soliton order of N=80. Since the soliton order changes with the core diameter, the initial soliton order reduces to N=54 when the core diameter reduces to 20 μm. This high soliton order ensures that the input radiation IRD is spectrally broadened in the MI regime.

As shown in FIG. 16(a), the onset of the MI process occurs in the first tapering-up section TU1 of the first waist region TP1. The first waist region TP1 causes (or at least aids) the MI dominated spectral expansion to begin at a distance of approximately 16 cm from the first fiber facet FF' (or the input fiber end). This is in contrast to the case shown in FIG. 12(b) where the input radiation IRD with the same pulse energy of 2.4 μJ does not generate the MI dominated spectral broadening even at a distance of 25 cm. Hence, the first waist region TP1 facilitates the onset of the MI process. Prior to entering the second waist region TP2, spectrum of the input radiation is significantly broadened covering a spectral range approximately between 450 nm and 1700 nm.

The DWG induced short wavelength extension begins when the pulsed input radiation IRD reaches the second waist region TP2 (more specifically the second central waist section CW2 of this second waist region). Consequently, the short wavelength edge of the spectrum is extended from about 450 nm down to about 300 nm. With the help of the first taper waist region, the DWG induced short wavelength extension is effectively obtained. This is again in contrast to the case shown in FIG. 12(b) where the input radiation IRD with the same pulse energy of 2.4 μJ does not even provide the DWG induced short wavelength extension due to the delayed onset of the MI process.

Figure 16B:
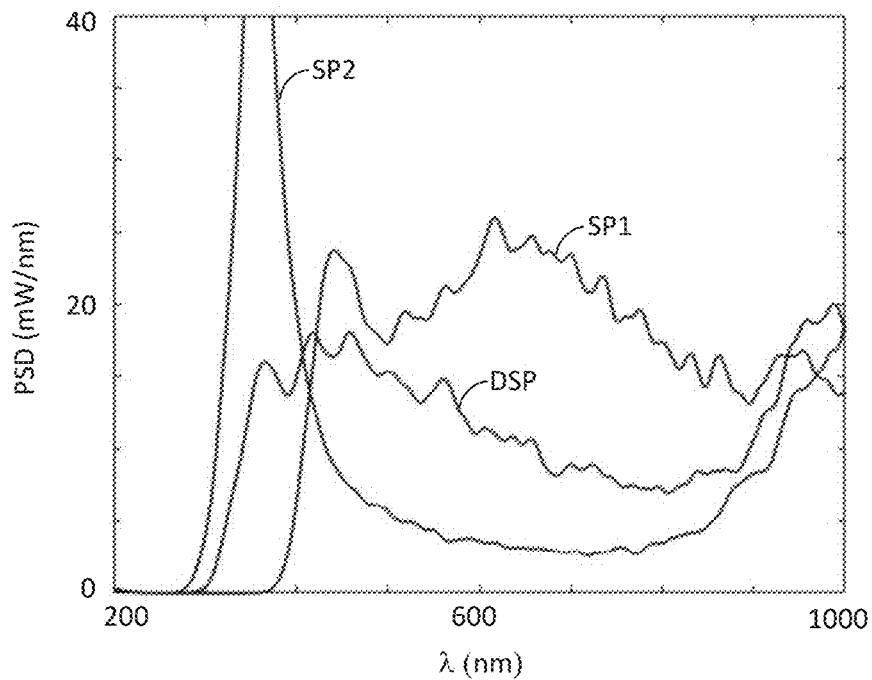
FIG. 16(b) shows a simulation of the output spectra of the radiation source with the same parameters as the simulation shown in FIG. 16(a)

FIG. 16(b) shows a simulation of the output spectra of the radiation source with the same parameters as the simulation shown in FIG. 16(a). In contrast to the un-optimized output spectrum USP generated shown in FIG. 13, with the same pump pulse energy, the double-waisted hollow core optical fiber DTF is able to significantly extend the short wavelength edge of the spectrum DSP while simultaneously maintaining a much smoother spectral profile (or a more balanced PSD profile).

To design the double-waisted hollow core optical fiber DTF for broadband radiation generation, it is thus desirable to ensure that the location and parameters of the first waist section are optimized to control the onset and the strength of the MI induced spectral expansion, and the location and parameters of the second waist region are optimized to control the onset and strength of the DWG. The onset of the MI induced spectral expansion may occur at a position between 5 cm and 30 cm from the first facet FF' of the double-waisted hollow core optical fiber DTF. For example, the MI onset position may be between 10 cm and 20 cm, between 14 cm and 16 cm, between 15 cm and 35 cm, between 20 cm and 30 cm, or between 24 cm and 28 cm from the first facet FF'. If for example the first central waist section CW1 of the first waist region TP1 is inappropriately long such that the dispersive waves are generated within the first waist region. In such a case, the desired short wavelength extension can be obtained, however, the output spectral profile is imbalanced and comprises a sharp UV peak, similar to the second output spectrum SP2. Therefore, in addition to optimizing each waist region for each process, it is also desirable to ensure the first waist region ends before the onset of the DWG. In some embodiments, the first tapering-up section TU1 may be located within a short distance of the onset of the MI process. Such a short distance may be in the range for example between −10 to 10 cm, between −5 to 5 cm, between −2.5 cm to 2.5 cm, or between −1 to 1 cm.

Note that the term "taper" used in the foregoing embodiments should be interpreted broadly as a portion of an optical fiber in which structural dimensions (e.g., internal core cross-sectional width, internal and/or external capillary cross-sectional width) of the fiber change along the fiber length. Therefore, a taper may be regarded as a structurally varied portion of an optical fiber OF while the non-tapered part of the optical fiber OF may be regarded as comprising one or more main portions. A waist region may not necessarily comprise all of the following three sections: the tapering-down section TD, a central waist section CW, a tapering-up section TU. It should be appreciated that the double-waisted hollow core optical fiber DTF is only an example. In other embodiments, one or more sections of the double-waisted hollow core optical fiber DTF may be precluded. For example, in an embodiment, the double-waisted hollow core optical fiber may comprise no third un-tapered section UT3. In a different embodiment, the double-waisted hollow core optical fiber may comprise no first un-tapered section UT1 nor any first tapering-down section TD1. In this case, the input radiation IRD may be directly coupled into the first central waist section CW1. It should also be appreciated that two or more waist regions can be applied to a hollow core optical fiber. More waist regions can bring additional flexibility when it comes to effectively control various different nonlinear optical processes. Note that, the application of two or more waist regions to a hollow core optical fiber for improving broadband radiation generation is not limited to control the MI process and the DWG. Two or more waist regions can also be applied for controlling other nonlinear processes in a gas filled hollow core optical fiber.

As described in the above embodiments, applying one or more waists or reduced cross-sectional width regions to a hollow core HC optical fiber OF, from which the broadband output radiation ORD is generated, allows careful manipulation of one or more nonlinear optical processes, e.g., strength and onset of the MI process and the DWG, in the fiber such that the short wavelength extension is attained in an effective and controlled manner. The extent of the short wavelength extension or the position of the short wavelength edge of the output spectrum is predominantly determined by the phase matching condition between the associated solitons and dispersive waves. Further short wavelength extension can be obtained by further reducing sizes of the waists applied to the hollow core HC optical fiber OF. However, there will be a limit to such an approach because smaller taper waist sizes lead to reduced optical transmission and increased manufacturing challenges.

Therefore, it is desirable to have a method that not only allows the short wavelength edge of the broadband output spectrum to be further extended into the UV region but also avoids having to further reduce the taper waists. Soliton trapping of dispersive waves can be used to extend the short wavelength extent of broadband output radiation ORD generated in a hollow core HC optical fiber OF. According to the publication, J C Travers, "Blue extension of optical fiber supercontinuum generation", Journal of Optics, 12 (2010) 113001, the soliton trapping process begins when a suitably intense soliton in the anomalous region temporally overlaps with a dispersive wave with the same group velocity, but in the normal dispersion region. In such a case, intra-pulse four-wave mixing can cause the dispersive wave to slightly blue-shift and the soliton to slightly red-shift. Consequently, the dispersive wave and the soliton are shifting into regions of lower group velocity and thus both are decelerated. If the temporal overlap between the soliton and the dispersive wave is maintained, the dispersive wave is trapped by the soliton while being continuously blue-shifted. On the other hand, if the wavelength shifts result in a group velocity mismatch between the soliton and the dispersive wave and when such a group velocity mismatch is sufficiently large, the two waves will eventually separate in time and the soliton trapping process will stop. Thus, the soliton trapping process can be maintained by matching the group velocities of the soliton and the dispersive wave or by minimizing the group velocity mismatch between the soliton and the dispersive wave.

Solitons have higher group velocities than the dispersive waves in the case where the broadband output radiation ORD is generated in an un-tapered or uniform hollow core HC optical fiber OF (e.g., a uniform HC-PCF) with a Raman free working medium WM (e.g., a noble gas or gas mixture) and the operating parameters (e.g., pump laser parameters) are selected to enable the MI dominated spectral expansion. As such, the dispersive wave, once generated, cannot catch up the soliton and thus the soliton trapping of the dispersive wave would not occur.

It is possible to initiate and maintain the soliton trapping process by applying at least one group velocity control mechanism to the hollow core HC optical fiber OF, from which the broadband output radiation ORD is generated. This is because the group velocity control mechanism is able to controllably alter the group velocities of the soliton and the dispersive wave so as to minimize their temporal separation and thus maintain their temporal overlap.

In some embodiments, the group velocity control mechanism may comprise at least one taper with a certain taper gradient. The taper gradient of each taper may be carefully optimized to alter the group velocities of the soliton and the dispersive wave to different extents. For example, a taper with an optimized taper gradient may decelerate the soliton more than it does the dispersive wave. This may effectively compensate or minimize the temporal separation between the soliton and the dispersive wave prior to entering the taper and therefore allow them to maintain a good temporal overlap while propagating through the fiber. By contrast, main purposes of the tapers or the waist regions TP, TP', TP1, TP2 shown in FIGS. 11(a), 11(b) and 15 are to control the strength and onset of the MI process and the DWG. Therefore, the impact of the taper gradient on soliton trapping of dispersive waves may not be taken into account when implementing those tapers.

Figure 17:
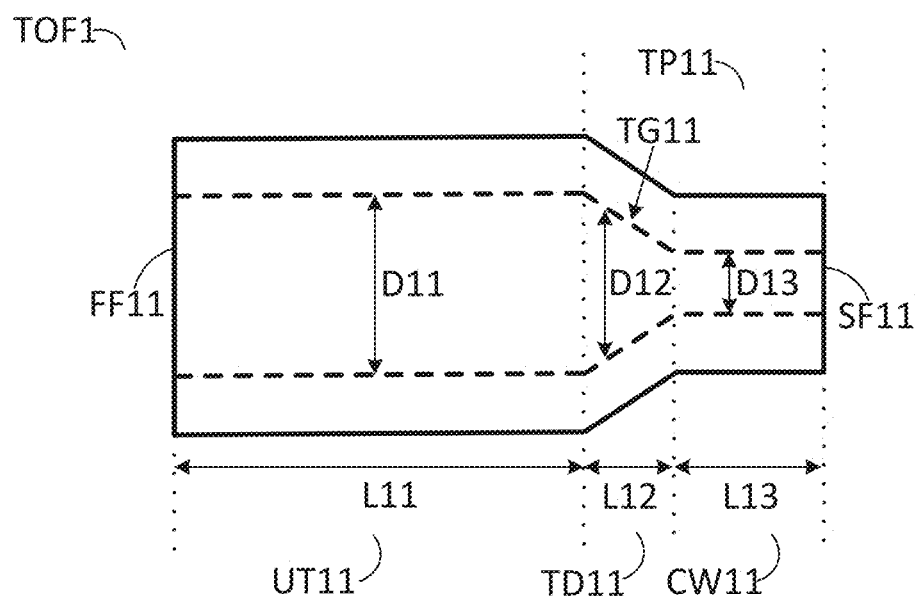
FIG. 17 schematically depicts an alternative single-waisted hollow core optical fiber configured for soliton trapping of dispersive waves, in accordance with an embodiment.

FIG. 17 schematically depicts a further single-waisted hollow core optical fiber configured for soliton trapping of dispersive waves, in accordance with an embodiment. As shown in the Figure, the single-waisted hollow core optical fiber TOF1 may comprise a first fiber facet FF11 for admitting the input radiation IRD and a second fiber facet SF11 for outputting the broadband output radiation ORD. The single-waisted hollow core optical fiber TOF1 may comprise three fiber sections, namely a uniform or un-tapered section UT11 with a first length L11, a tapering down section TD11 with a second length L12, and a central waist section CW11 with a third length L13. The uniform section UT11 may have a first hollow core cross-sectional width D11 which remains constant along the length of the section. By contrast, the tapering down section TD11 may have a second hollow core cross-sectional width D12 which decreases continuously and substantially linearly along the length of the section. The third section, i.e. the central waist section CW11, may start immediately after the tapering down section TD11 and may have a third hollow core cross-sectional width D13 which is reduced with respect to the first core cross-sectional width D11 but remains constant along the length of the section. The tapering down section TD11 and the central waist section CW11 may form a waist region or taper TP11, as defined in the above embodiments.

In this embodiment, the second hollow core cross-sectional width D12 may decrease with a predefined taper gradient TG11. The taper gradient TG11 may be used to describe how fast the hollow core size changes along the length of the fiber and may be defined as follows:

$$TG = \Delta R / \Delta L, \quad \text{Eq. [4]}$$

where $\Delta R$ denotes the change of the hollow core radius in any given part of the tapering down section TD11 and $\Delta L$ denotes the fiber length within which the change of the hollow core radius $\Delta R$ occurs. The taper gradient may fall within the range, for example, between 0.01 μm/cm and 10 μm/cm, between 0.05 μm/cm and 5 μm/cm, between 0.1 μm/cm and 1 μm/cm, or between 0.1 μm/cm and 0.5 μm/cm.

Figure 18A:
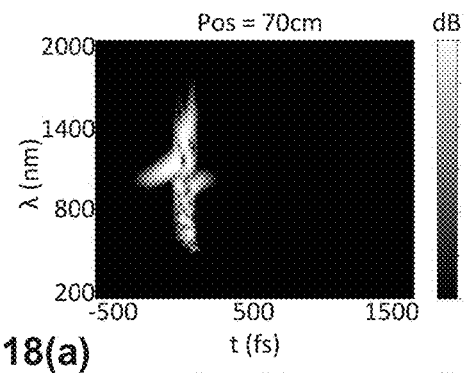
FIGS. 18(a) and 18(b) show two spectrograms of a simulation describing the temporal and spectral distribution of a pulse of input radiation after propagating through a uniform hollow core optical fiber a distance of 70 cm and a distance of 110 cm, respectively.
Figure 18B:
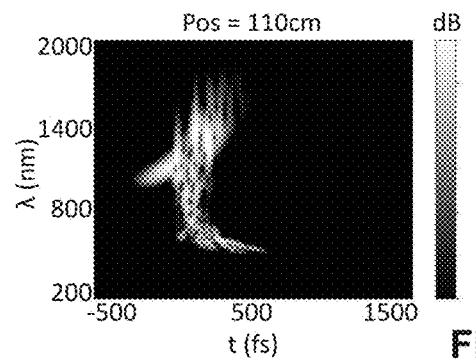

FIGS. 18(a) and 18(b) are two spectrograms of a simulation describing the temporal and spectral distribution of a pulse of input radiation after respectively propagating a distance of 70 cm and 110 cm within a uniform hollow core optical fiber. The horizontal axis represents the temporal distribution or delay time between spectral components of the input radiation whilst the vertical axis represents the spectral distribution of the input radiation. The contrast of the grayscale plot ranges from black at the weakest energy (dB) to white at the strongest.

In this example simulation, the uniform hollow core HC optical fiber OF (e.g., a single ring HC-ARF as illustrated in FIG. 7) may have a length of 110 cm and a core diameter of 30 μm (or a core radius of 15 μm). The position Pos=70 cm may correspond to a position in the fiber with a distance of 70 cm from the first fiber facet F11 and the position Pos=110 cm may correspond to the position of the second fiber facet SF11. The hollow core HC may be filled with a working medium WM of krypton gas at a pressure of 25.7 bar. The pulsed input radiation IRD has a pump pulse duration of $\tau$ of 150 fs, a pulse energy $E_p$ of 0.5 μJ energy and a centroid wavelength $\lambda$ of 1030 nm. The pulse input radiation IRD may be admitted into the fiber via the first fiber facet FF11 and may exit the fiber via the second fiber facet SF11. This configuration allows pumping in the anomalous dispersion regime. Upon launching into the single-waisted hollow core optical fiber TOF1, the pulsed input radiation (or the pump pulse) IRD evolves into a high order soliton with a soliton order of N=23 which ensures the MI dominated nonlinear optical process. As can be seen in FIG. 18(a), the delay time between the dispersive wave around 580 nm and the soliton around 1380 nm is less than 100 fs and as such they are still partially overlapped in time. However, after propagating a further distance of 40 cm, the delay time between the dispersive wave and the soliton increases to more than 300 fs. Such a large delay time results in a complete temporal separation between the dispersive wave and the soliton and consequently prevents the soliton trapping process from occurring.

Figure 18C:
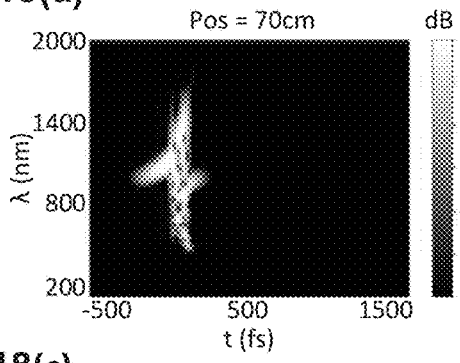
FIGS. 18(c) and 18(d) show two spectrograms of a simulation describing the temporal and spectral distribution of a pulse of input radiation after propagating through a single-waisted hollow core optical fiber (e.g., as shown in FIG. 17)
Figure 18D:
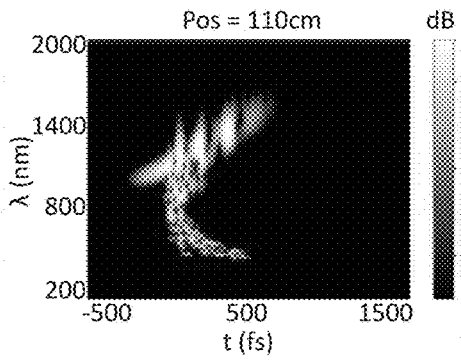

FIGS. 18(c) and 18(d) are two spectrograms of a simulation describing the temporal and spectral distribution of a pulse of input radiation after propagating respectively a distance of 70 cm and a distance of 110 cm within the single-waisted hollow core optical fiber (e.g., as shown in FIG. 17). This simulation is based on the same operating parameters that have been used in the simulation shown in FIGS. 18(a) and 18(b). The single-waisted hollow core optical fiber TOF1 may have a length of 110 cm. The waist region may start immediately after a distance of 70 cm from the first fiber facet FF11 of the fiber and may end at the second fiber facet SF11, as shown in FIG. 17. The first hollow core dimeter D11 may be 30 μm and the taper gradient TG11 may be 0.2 μm/cm which leads to a reduced hollow core diameter of 24 μm at the end of the tapering down section TD11 (e.g., the third hollow core diameter D13). Such a reduced hollow core size may remain substantially constant along the length of the central waist section CW11.

As can be seen in FIG. 18(c), the temporal and spectral distribution of the input radiation IRD is the same as that shown in FIG. 18(a), simply due to the fact that the un-tapered section UT11 of the single-waisted fiber TOF1 has the same structural dimensions (except the length) as the uniform fiber (now shown) used in the simulation shown in FIG. 18(a). FIG. 18(d) confirms that the use of the waist region slows down the soliton in such a manner that a good temporal overlap between the dispersive wave and the soliton is substantially maintained till exiting the fiber via the second fiber facet SF11. The good temporal overlap may correspond to a delay time, for example, less than 50 fs, less than 20 fs, or less than 10 fs. Such a good temporal overlap enables the soliton trapping of the dispersive wave which results in a further blue-shift of the short wavelength edge from 580 nm, as shown in FIG. 18(b), to below 500 nm, as shown in FIG. 18(d).

Figure 19:
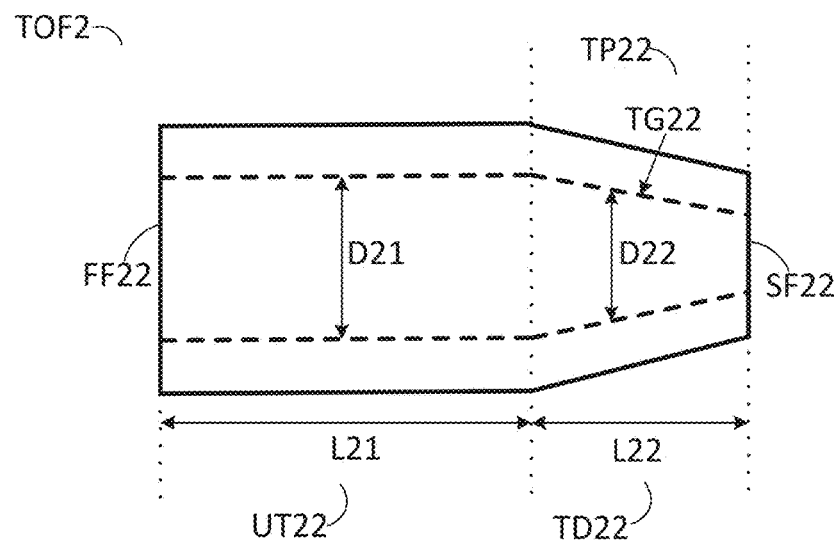
FIG. 19 schematically depicts a further alternative single-waisted hollow core optical fiber configured for soliton trapping of dispersive waves, in accordance with an embodiment.

FIG. 19 schematically depicts another different single-waisted hollow core optical fiber configured for soliton trapping of dispersive waves, in accordance with an embodiment. The single-waisted hollow core optical fiber TOF2 may comprise a first fiber facet FF22 for admitting the input radiation IRD and a second fiber facet SF22 for outputting the broadband output radiation ORD. The fiber may comprise only two sections: an un-tapered/uniform section UT22 with a first length L21 and a tapering down section TD22 with a second length L22. The uniform section UT22 may have a first hollow core cross-sectional width D21 which remains constant along the length of the section. The tapering down section TD22 may have a second hollow core cross-sectional width D22 which decreases continuously and substantially linearly along the length of the section with a taper gradient TG22. The tapering down section TD22 may form a waist region or taper TP22, as defined in the above embodiments.

FIGS. 20(a) and 20(b) are two spectrograms of a simulation describing the temporal and spectral distribution of a pulse of input radiation after propagating respectively a distance of 27 cm and a distance of 42 cm within a uniform hollow core optical fiber. In this example simulation, the uniform hollow core HC optical fiber OF (e.g., e.g., a single ring HC-ARF as illustrated in FIG. 7) may have a length of 42 cm and a core diameter of 30 μm (or a core radius of 15 μm). The position Pos=27 cm may correspond to a position in the fiber with a distance of 27 cm from the first fiber facet F11 and the position Pos=42 cm may correspond to the position of the second fiber facet SF22. The hollow core HC may be filled with a working medium WM of Krypton gas at a pressure of 25.7 bar. The pulsed input radiation IRD has a pump pulse duration of τ of 280 fs, a pulse energy $E_p$ of 5.3 µJ energy and a centroid wavelength λ of 1030 nm. The pulse input radiation IRD may be admitted into the fiber via the first fiber facet FF11 and may exit the fiber via the second fiber facet SF11. This configuration allows pumping in the anomalous dispersion regime. Upon launching into the single-waisted hollow core optical fiber TOF2, the pulsed input radiation (or the pump pulse) IRD evolves into a high order soliton with a soliton order of N=104 which ensures the MI dominated nonlinear optical process.

As can be seen in FIG. 20(a), the delay time between the dispersive wave around 400 nm and the soliton around 1800 nm is less than 100 fs and as such they are still partially overlapped in time. However, after propagating a further distance of 15 cm, the delay time between the dispersive wave and the soliton increases to more than 500 fs. Such a large delay time again results in a complete temporal separation between the dispersive wave and the soliton and consequently prevents the soliton trapping process from occurring.

FIGS. 20(c) and 20(d) are two spectrograms of a simulation describing the temporal and spectral distribution of a pulse of input radiation after propagating within the single-waisted hollow core optical fiber (e.g., as shown in FIG. 19) a distance of 27 cm and a distance of 42 cm, respectively. This simulation is based on the same operating parameters that have been used in the simulation shown in FIGS. 20(a) and 20(b). The single-waisted hollow core optical fiber TOF2 may have a length of 42 cm. The waist region may start immediately after a distance of 27 cm from the first fiber facet FF22 of the fiber and may end at the second fiber facet SF22, as shown in FIG. 19. The first hollow core diameter D21 may remain constant at 30 µm The taper gradient TG22 may be 0.5 µm/cm which leads to a reduced hollow core diameter of 15 µm at the second fiber facet SF22 (e.g., the second hollow core diameter D22 at the second fiber facet SF22).

The temporal and spectral distribution of the input radiation IRD shown in FIG. 20(c) is the same as that shown in FIG. 20(a) due to the fact that the un-tapered section UT22 of the single-waisted fiber TOF2 has the same structural dimensions (except the length) as the uniform fiber (now shown) used in the simulation shown in FIG. 20(a). FIG. 20(d) confirms that the use of the waist region slows down the soliton in such a manner that the temporal overlap between the dispersive wave and the soliton is substantially maintained till exiting the fiber via the second fiber facet SF22. This results in the dispersive wave being temporally and spectrally trapped by the soliton which in turn results in a further blue-shift of the short wavelength edge from 400 nm, as shown in FIG. 20(b), to below 300 nm, as shown in FIG. 20(d).

In some embodiments, the group velocity control mechanism may comprise a Raman active working medium WM. The Raman active working medium may be a filling gas or gas mixture comprising at least one Raman active gas. The Raman active gas may be for example hydrogen, deuterium and/or nitrogen. As described above, the Raman active working medium alone is able to decelerate the soliton with respect to the dispersive wave and therefore allows to obtain soliton trapping of the dispersive wave in an un-tapered hollow core optical fiber rather than in a tapered fiber. In some embodiments, the Raman active working medium may be configured to minimize the temporal separation between the dispersive wave and the soliton so as to ensure a good temporal overlap between the two. The good temporal overlap may correspond to a delay time, for example, less than 50 fs, less than 20 fs, or less than 10 fs.

In different embodiments, two or more group velocity control mechanisms may be used together. For example, in an embodiment, a single-waisted hollow core optical fiber, such as the tapered fiber TOF1, TOF2 shown in FIG. 17 or FIG. 19, may be filled with a Raman active working medium. In this case, the waist region of the fiber and the Raman active working medium (e.g., a filling gas or gas mixture comprising at least one Raman active gas) may be configured to result in a combined effect on the input radiation IRD such that the temporal separation between the dispersive wave and the soliton is minimized and the soliton trapping process is maintained.

Note that the above described single-waisted hollow core optical fibers TOF1, TOF2 configured for soliton trapping of dispersive waves are non-limiting examples. Other hollow core optical fibers with two or more waist regions can be equally applicable. Note also that the single waist region TP11, TP22 of the single-waisted hollow core optical fibers TOF1, TOF2 can be configured and located not only to trigger the onset of the DWG but also to enable and maintain the soliton trapping process. In an embodiment, a double-waisted hollow core optical fiber (e.g., as shown in FIG. 15) may be configured such that the first waist region is optimized for initiating the MI process while the second waist region TP2 is optimized for initiating both the DWG and soliton trapping process. In another embodiment, the double-waisted hollow core optical fiber may be filled with a Raman active filling gas. The use of a Raman active filling gas may add an additional degree of freedom when it comes to optimization of the soliton trapping process. In other embodiments, one or more group velocity control mechanisms (e.g., a tapered hollow core optical fiber and/or a Raman active filling gas) may be applied to a single-waisted or double waisted hollow core optical fiber (e.g., as shown in FIG. 11(a), FIG. 11(b), or FIG. 15) configured for generation of broadband output radiation with a smooth spectral profile and an extended short wavelength edge.

FIG. 21 is a block diagram that illustrates a computer system 2100 that may assist in implementing methods and flows disclosed herein. Computer system 2100 includes a bus 2002 or other communication mechanism for communicating information, and a processor 2104 (or multiple processors 2104 and 2105) coupled with bus 2102 for processing information. Computer system 2100 also includes a main memory 2106, such as a random access memory (RAM) or other dynamic storage device, coupled to bus 2102 for storing information and instructions to be executed by processor 2104. Main memory 2106 also may be used for storing temporary variables or other intermediate information during execution of instructions to be executed by processor 2104. Computer system 2100 further includes a read only memory (ROM) 2108 or other static storage device coupled to bus 2102 for storing static information and instructions for processor 2104. A storage device 2110, such as a magnetic disk or optical disk, is provided and coupled to bus 2102 for storing information and instructions.

Computer system 2100 may be coupled via bus 2102 to a display 2112, such as a cathode ray tube (CRT) or flat panel or touch panel display for displaying information to a computer user. An input device 2014, including alphanumeric and other keys, is coupled to bus 2102 for communicating information and command selections to processor

2104. Another type of user input device is cursor control 2116, such as a mouse, a trackball, or cursor direction keys for communicating direction information and command selections to processor 2104 and for controlling cursor movement on display 2112. This input device typically has two degrees of freedom in two axes, a first axis (e.g., x) and a second axis (e.g., y), that allows the device to specify positions in a plane. A touch panel (screen) display may also be used as an input device.

One or more of the methods as described herein may be performed by computer system 2000 in response to processor 2104 executing one or more sequences of one or more instructions contained in main memory 2106. Such instructions may be read into main memory 2106 from another computer-readable medium, such as storage device 2110. Execution of the sequences of instructions contained in main memory 2106 causes processor 2104 to perform the process steps described herein. One or more processors in a multi-processing arrangement may also be employed to execute the sequences of instructions contained in main memory 2106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 2104 for execution. Such a medium may take many forms, including but not limited to, non-volatile media, volatile media, and transmission media. Non-volatile media include, for example, optical or magnetic disks, such as storage device 2110. Volatile media include dynamic memory, such as main memory 2106. Transmission media include coaxial cables, copper wire and fiber optics, including the wires that comprise bus 2102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2104 for execution. For example, the instructions may initially be borne on a magnetic disk of a remote computer. The remote computer can load the instructions into its dynamic memory and send the instructions over a telephone line using a modem. A modem local to computer system 2100 can receive the data on the telephone line and use an infrared transmitter to convert the data to an infrared signal. An infrared detector coupled to bus 2102 can receive the data carried in the infrared signal and place the data on bus 2102. Bus 2102 carries the data to main memory 2106, from which processor 2104 retrieves and executes the instructions. The instructions received by main memory 2106 may optionally be stored on storage device 2110 either before or after execution by processor 2104.

Computer system 2100 also includes a communication interface 2118 coupled to bus 2102. Communication interface 2118 provides a two-way data communication coupling to a network link 2120 that is connected to a local network 2122. For example, communication interface 2118 may be an integrated services digital network (ISDN) card or a modem to provide a data communication connection to a corresponding type of telephone line. As another example, communication interface 2118 may be a local area network (LAN) card to provide a data communication connection to a compatible LAN. Wireless links may also be implemented. In any such implementation, communication interface 2118 sends and receives electrical, electromagnetic or optical signals that carry digital data streams representing various types of information.

Network link 2120 typically provides data communication through one or more networks to other data devices. For example, network link 2120 may provide a connection through local network 2122 to a host computer 2124 or to data equipment operated by an Internet Service Provider (ISP) 2126. ISP 2126 in turn provides data communication services through the worldwide packet data communication network, now commonly referred to as the "Internet" 2128. Local network 2122 and Internet 2128 both use electrical, electromagnetic or optical signals that carry digital data streams. The signals through the various networks and the signals on network link 2120 and through communication interface 2128, which carry the digital data to and from computer system 2100, are exemplary forms of carrier waves transporting the information.

Computer system 2100 may send messages and receive data, including program code, through the network(s), network link 2120, and communication interface 2118. In the Internet example, a server 2030 might transmit a requested code for an application program through Internet 2128, ISP 2126, local network 2122 and communication interface 2118. One such downloaded application may provide for one or more of the techniques described herein, for example. The received code may be executed by processor 2104 as it is received, and/or stored in storage device 2110, or other non-volatile storage for later execution. In this manner, computer system 2100 may obtain application code in the form of a carrier wave.

Further embodiments are disclosed in the following list of numbered clauses:

1. A broadband light source device, being configured for generating a broadband output radiation upon receiving pump radiation, comprising:
    a hollow-core photonic crystal fiber (HC-PCF) comprising at least one structurally varied portion having at least one structural parameter of the HC-PCF varied with respect to one or more main portions of the HC-PCF,
    wherein the at least one structurally varied portion comprises at least a first structurally varied portion located downstream of a position along the length of the HC-PCF where the pump radiation will have been spectrally expanded by a modulation instability dominated nonlinear optical process, and
    wherein the at least one structurally varied portion is configured and located such that the broadband output radiation comprises wavelengths in the ultraviolet spectral region.

2. A broadband light source device as defined in clause 1, wherein one or more of the at least one structurally varied portion each comprises at least one reduced diameter portion, each the at least one reduced diameter portion comprising an internal core diameter which is reduced with respect to a main internal core diameter associated with the one or more main portions of the HC-PCF.

3. A broadband light source device as defined in clause 2, wherein each reduced diameter portion of the at least one reduced diameter portion comprises a first tapered portion which is tapered in a first direction, such that the internal core diameter reduces over the length of the first tapered portion from the main internal core diameter to a second internal core diameter which is smaller than the main internal core diameter.

4. A broadband light source device as defined in clause 3, wherein one or more of the at least one reduced diameter portion comprises a second tapered portion having a taper in a direction opposite the first direction, such that the internal core diameter increases over the length of the second tapered portion from the second internal core diameter to the main internal core diameter.

5. A broadband light source device as defined in clause 4, wherein one or more of the at least one reduced diameter portion comprises a central waist section between the first tapered portion and second tapered portion, the central waist section having the second internal core diameter along its length.

6. A broadband light source device as defined in any preceding clause, wherein one or more of the at least one structurally varied portion each comprise different structural dimensions of an inner cladding structure of the HC-PCF with respect to the one or more main portions of the HC-PCF.

7. A broadband light source device as defined in clause 6, wherein the different structural dimensions of the inner cladding structure of the HC-PCF comprise different capillary tube diameters.

8. A broadband light source device as defined in any preceding clause, wherein a beginning of the first structurally varied portion is located downstream of the position along the length of the HC-PCF where the pump radiation will have been spectrally expanded by a modulation instability dominated nonlinear optical process.

9. A broadband light source device as defined in any preceding clause, wherein the first structurally varied portion is configured to control a second nonlinear optical process.

10. A broadband light source device as defined in clause 9, wherein the second nonlinear optical process comprises dispersive wave generation.

11. A broadband light source device as defined in clause 10, wherein the at least one structurally varied portion further comprises a second structurally varied portion located upstream of the first structurally varied portion, the second structurally varied portion being configured and located to control the MI dominated nonlinear optical process.

12. A broadband light source device as defined in clause 11, wherein the second structurally varied portion is configured such that the second nonlinear optical process does not begin in the first structurally varied portion.

13. A broadband light source device as defined in clause 12, wherein the second structurally varied portion is configured and located such that the dispersive wave generation further extends the short wavelength bound of the broadband output radiation.

14. A broadband light source device as defined in any of clauses 10 to 13, further comprising at least one group velocity control mechanism configured to minimize a temporal separation between at least one soliton and at least one dispersive wave both generated by the MI dominated nonlinear optical process such that the short wavelength bound of the broadband output radiation is further extended via a soliton trapping process.

15. A broadband light source device as defined in clause 14, wherein the at least one group velocity control mechanism comprises at least one reduced diameter portion comprising an internal core diameter which decreases with a tapering gradient configured to decelerate the at least one soliton with respect to the at least one dispersive wave so as to minimize their temporal separation.

16. A broadband light source device as defined in clause 15, wherein the at least one reduced diameter portion is comprised within the first structurally varied portion.

17. A broadband light source device as defined in clause 15 or clause 16, wherein the tapering gradient is in the range between 0.01 µm/cm and 10 µm/cm.

18. A broadband light source device as defined in any of clauses 14 to 17, wherein the at least one group velocity control mechanism comprises a Raman active gas or gas mixture configured to fill the HC-PCF and configured to decelerate the at least one soliton with respect to the at least one dispersive wave so as to minimize their temporal separation.

19. A broadband light source device, being configured for generating broadband output radiation upon receiving pump radiation, comprising:
 a hollow-core photonic crystal fiber (HC-PCF) comprising at least a first structurally varied portion and a second structurally varied portion, wherein each of the first structurally varied portion and the second structurally varied portion has at least one structural parameter of the HC-PCF varied with respect to one or more main portions of the HC-PCF, at least one of the one or more main portions of the HC-PCF separating the first structurally varied portion and second structurally varied portion.

20. A broadband light source device as defined in clause 19, wherein each of the first structurally varied portion and a second structurally varied portion comprises at least one reduced diameter portion, each the at least one reduced diameter portion comprising an internal core diameter which is reduced with respect to a main internal core diameter associated with the one or more main portions of the HC-PCF.

21. A broadband light source device as defined in clause 20, wherein each reduced diameter portion of the at least one reduced diameter portion comprises a first tapered portion which is tapered in a first direction, such that the internal core diameter reduces over the length of the first tapered portion from the main internal core diameter to a second internal core diameter which is smaller than the main internal core diameter.

22. A broadband light source device as defined in clause 21, wherein one or more of the at least one reduced diameter portion comprises a second tapered portion having a taper in a direction opposite the first direction, such that the internal core diameter increases over the length of the second tapered portion from the second internal core diameter to the main internal core diameter.

23. A broadband light source device as defined in clause 22, wherein one or more of the at least one reduced diameter portion comprises a central waist section between the first tapered portion and second tapered portion, the central waist section having the second internal core diameter along its length.

24. A broadband light source device as defined in any of clauses 19 to 23, wherein one or more of the at least one structurally varied portion each comprise different structural dimensions of an inner cladding structure of the HC-PCF with respect to the one or more main portions of the HC-PCF.

25. A broadband light source device as defined in clause 24, wherein the different structural dimensions of the inner cladding structure of the HC-PCF comprise different capillary tube diameters.

26. A broadband light source device as defined in clause 25, wherein the first structurally varied portion and the second structurally varied portion are each configured and located to control a first nonlinear optical process and second nonlinear optical process responsible for generation of the broadband output radiation.

27. A broadband light source device as defined in clause 26, wherein the first structurally varied portion is configured and located such that the second nonlinear optical process does not begin in the first structurally varied portion.

28. A broadband light source device as defined in clause 27, wherein the first nonlinear optical process comprises modulation instability and the second nonlinear optical process comprises dispersive wave generation.

29. A broadband light source device as defined in clause 28, wherein the first structurally varied portion is configured and located such that the modulation instability spectrally expands the pump radiation while the second structurally varied portion is configured and located such that the dispersive wave generation further extends the short wavelength edge of the spectrally expanded pump radiation.

30. A broadband light source device as defined in clause 29, further comprising at least one group velocity control mechanism configured to minimize a temporal separation between at least one soliton and at least one dispersive wave both generated by the MI dominated nonlinear optical process such that the short wavelength bound of the broadband output radiation is further extended via a soliton trapping process.

31. A broadband light source device as defined in clause 30, wherein the at least one group velocity control mechanism comprises at least one reduced diameter portion, each the at least one reduced diameter portion comprising an internal core diameter which decreases from the main internal core diameter with a tapering gradient over the length of the at least one reduced diameter portion, the tapering gradient being configured to decelerate the at least one soliton with respect to the at least one dispersive wave so as to minimize their temporal separation.

32. A broadband light source device as defined in clause 31, wherein the at least one reduced diameter portion is comprised within the second structurally varied portion.

33. A broadband light source device as defined in clause 31 or clause 32, wherein the tapering gradient is in the range between 0.01 µm/cm and 10 µm/cm.

34. A broadband light source device as defined in any of clauses 30 to 33, wherein the at least one group velocity control mechanism comprises a Raman active gas or gas mixture configured to fill a hollow core of the HC-PCF from which the broadband output radiation is generated and configured to decelerate the at least one soliton with respect to the at least one dispersive wave so as to minimize their temporal separation.

35. A broadband light source device as defined in any preceding clause, wherein the first structurally varied portion and the second structurally varied portion are further configured to support propagation of substantially the fundamental mode of the pump radiation.

36. A broadband light source device as defined in any preceding clause, wherein the wavelengths in the ultraviolet region comprise wavelengths down to 300 nm.

37. A broadband light source device as defined in any preceding clause, wherein the wavelengths in the ultraviolet region comprise wavelengths down to 200 nm.

38. A broadband light source device as defined in any preceding clause, wherein the broadband output radiation comprises wavelengths up to 2000 nm.

39. A broadband light source device as defined in any preceding clause, wherein the broadband output radiation comprises wavelengths up to 3000 nm.

40. A broadband light source device as defined in any preceding clause, wherein at least the first structurally varied portion is configured and located such that a point spread power spectral density of a spectrum of the broadband output radiation does not vary by more than 50% from an average over a wavelength range of interest.

41. A broadband light source device as defined in clause 40, wherein the wavelength range of interest comprises at least wavelengths between 400 nm and 1000 nm.

42. A broadband light source device as defined in clause 40, wherein the wavelength range of interest comprises at least wavelengths between 400 nm and 2000 nm.

43. A broadband light source device as defined in clause 40, wherein the wavelength range of interest comprises at least wavelengths between 200 nm and 2000 nm.

44. A broadband light source device as defined in any preceding clause, wherein at least the first structurally varied portion is configured and located such that a point spread power spectral density of a spectrum of the broadband output radiation does not comprise any peaks having a point spread power spectral density more than two times an average point spread power spectral density for the spectrum.

45. A broadband light source device as defined in any preceding clause, further comprising a pump radiation source for generating the pump radiation.

46. A broadband light source device as defined in clause 45, wherein the pump radiation source is configured such that the pump radiation comprises a pulse energy in a range between 1 µJ and 10 µJ.

47. A broadband light source device as defined in any preceding clause, wherein the HC-PCF comprises a single ring HC-PCF.

48. A broadband light source device as defined in any of clauses 19 to 47, wherein a beginning of the first structurally varied portion is located at a position between 5 cm and 30 cm from an input end of the HC-PCF.

49. A broadband light source device as defined in any of clauses 19 to 47, wherein a beginning of the first structurally varied portion is located at a position between 10 cm and 20 cm from an input end of the HC-PCF.

50. A broadband light source device as defined in any of clauses 19 to 47, wherein a beginning of the first structurally varied portion is located at a position between 14 cm and 16 cm from an input end of the HC-PCF.

51. A broadband light source device as defined in any of clauses 19 to 50, wherein a beginning of the second structurally varied portion is located at a position between 15 cm and 35 cm from an input end of the HC-PCF.

52. A broadband light source device as defined in any of clauses 19 to 50, wherein a beginning of the second structurally varied portion is located at a position between 20 cm and 30 cm from an input end of the HC-PCF.

53. A broadband light source device as defined in any of clauses 19 to 50, wherein a beginning of the second structurally varied portion is located at a position between 24 cm and 28 cm from an input end of the HC-PCF.

54. A metrology device comprising a broadband light source device as defined in any preceding clause.

55. A metrology device as defined in clause 36, comprising a scatterometer metrology apparatus, a level sensor or an alignment sensor.

56. A method of optimizing a location of at least a first structurally varied portion along a length of a hollow-core photonic crystal fiber (HC-PCF), such that broadband output radiation generated from the HC-PCF following excitation by input radiation comprises wavelengths in the ultraviolet region, wherein the optimization comprises:
  determining a location along the length of the HC-PCF where the pump radiation will be spectrally expanded by a modulation instability dominated nonlinear optical process, and
  locating the first structurally varied portion downstream of the determined location.

57. A method as defined in clause 56, wherein the locating step optimizes the location of a beginning of the first structurally varied portion.

58. A method as defined in clause 56 or 57, wherein the determining step is performed by simulation of a generation process of the broadband output radiation within the HC-PCF.

59. A method as defined in any of clauses 56 to 58, wherein the determining step is performed by:
  a) measuring an output spectrum and power output from a length of hollow core optical fiber comprising no structurally varied portion
  b) cutting this length of hollow core optical fiber at a point near the input end to obtain a shortened length;
  c) repeating steps a) and b) on each shortened length until the measured output spectrum confirms that the modulation instability dominated nonlinear optical process has occurred.

60. A method as defined in any of clauses 56 to 59, wherein the locating step results in the broadband output radiation comprising wavelengths down to 300 nm.

61. A method as defined in any of clauses 56 to 59, wherein the locating step results in the broadband output radiation comprising wavelengths down to 200 nm.

62. A method as defined in any of clauses 56 to 61, wherein the locating step results in the broadband output radiation comprising wavelengths up to 2000 nm.

63. A method as defined in any of clauses 56 to 61, wherein the locating step results in the broadband output radiation comprising wavelengths up to 3000 nm.

64. A method as defined in any of clauses 56 to 63, wherein the locating step is such that a point spread power spectral density of a spectrum of the broadband output radiation does not vary by more than 50% from an average over a wavelength range of interest.

65. A method as defined in clause 64, wherein the wavelength range of interest comprises at least wavelengths between 400 nm and 1000 nm.

66. A method as defined in clause 64, wherein the wavelength range of interest comprises at least wavelengths between 400 nm and 2000 nm.

67. A method as defined in clause 64, wherein the wavelength range of interest comprises at least wavelengths between 200 nm and 2000 nm.

68. A method as defined in any of clauses 56 to 67, wherein at least the locating step is such that a point spread power spectral density of a spectrum of the broadband output radiation does not comprise any peaks having a point spread power spectral density more than two times an average point spread power spectral density for the spectrum.

69. A method as defined in any of clauses 56 to 68, wherein the optimization comprises co-optimizing the location and an energy of the input radiation.

70. A method as defined in any of clauses 56 to 69, wherein the locating step optimizes the first structurally varied portion to control a second nonlinear optical process.

71. A method as defined in any of clauses 56 to 70, wherein the optimizing step comprises optimizing a location of a second structurally varied portion along the length of the HC-PCF.

72. A method as defined in clause 71, wherein the optimizing a second location comprises optimizing the location of the second structurally varied portion to control the MI dominated nonlinear optical process.

73. A method as defined in clause 72, wherein the optimization step comprises optimizing the location of the first structurally varied portion and the location of the second structurally varied portion such that the second nonlinear optical process does not begin in the first structurally varied portion.

74. A method as defined in clause 73, comprising optimizing the location of the second structurally varied portion such that the dispersive wave generation further extends the short wavelength bound of the broadband output radiation.

75. A method as defined in any of clauses 70 to 74, wherein the second nonlinear optical process comprises dispersive wave generation.

76. A method as defined in any of clauses 56 to 75, wherein the optimization further comprises applying at least one group velocity control mechanism to minimize a temporal separation between at least one soliton and at least one dispersive wave both generated by the MI dominated nonlinear optical process such that the short wavelength bound of the broadband output radiation is further extended via a soliton trapping process.

77. A method as defined in clause 76, wherein the at least one group velocity control mechanism comprises at least one reduced diameter portion comprising an internal core diameter which decreases with a tapering gradient configured to decelerate the at least one soliton with respect to the at least one dispersive wave so as to minimize their temporal separation.

78. A method as defined in clause 77, wherein the at least one reduced diameter portion is comprised within the first structurally varied portion.

79. A method as defined in clause 77 or 78, wherein the tapering gradient is in the range between 0.01 µm/cm and 10 µm/cm.

80. A method as defined in any of clauses 76 to 79, wherein the at least one group velocity control mechanism comprises a Raman active gas or gas mixture configured to fill a hollow core of the HC-PCF from which the broadband output radiation is generated and configured to decelerate the at least one soliton with respect to the at least one dispersive wave so as to minimize their temporal separation.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A broadband radiation source device configured for generating broadband output radiation upon receiving pump radiation, the device comprising:
   a hollow-core photonic crystal fiber (HC-PCF) comprising at least a first structurally varied portion and a second structurally varied portion, wherein each of the first structurally varied portion and the second structurally varied portion is configured to have the pump radiation pass therethrough and has at least one structural parameter of the HC-PCF varied with respect to one or more main portions of the HC-PCF so as to narrow or widen a hollow core region through which the pump radiation passes, at least one of the one or more main portions of the HC-PCF separating the first structurally varied portion and second structurally varied portion.

2. The device as claimed in claim 1, wherein the first structurally varied portion and the second structurally varied portion are each configured and located to control a first nonlinear optical process and second nonlinear optical process responsible for generation of the broadband output radiation.

3. The device as claimed in claim 2, wherein the first structurally varied portion is configured and located such that the second nonlinear optical process does not begin in the first structurally varied portion.

4. The device as claimed in claim 3, wherein the first nonlinear optical process comprises modulation instability and the second nonlinear optical process comprises dispersive wave generation.

5. The device as claimed in claim 1, wherein the first structurally varied portion and the second structurally varied portion are further configured to support propagation of substantially the fundamental mode of the pump radiation.

6. The device as claimed in claim 1, wherein at least the first structurally varied portion is configured and located such that a point spread power spectral density of a spectrum of the broadband output radiation does not vary by more than 50% from an average over a wavelength range of interest.

7. The device as claimed in claim 1, wherein at least the first structurally varied portion is configured and located such that a point spread power spectral density of a spectrum of the broadband output radiation does not comprise any peaks having a point spread power spectral density more than two times an average point spread power spectral density for the spectrum.

8. The device as claimed in claim 1, further comprising a pump radiation source for generating the pump radiation.

9. The device as claimed in claim 8, wherein the pump radiation source is configured such that the pump radiation comprises a pulse energy in a range between 1 µJ and 10 µJ.

10. The device as claimed in claim 1, wherein the HC-PCF comprises a single ring HC-PCF.

11. The device as claimed in claim 1, wherein a beginning of the first structurally varied portion is located at a position between 5 cm and 30 cm from an input end of the HC-PCF.

12. The device as claimed in claim 1, wherein a beginning of the second structurally varied portion is located at a position between 15 cm and 35 cm from an input end of the HC-PCF.

13. A metrology device comprising:
   a detector; and
   the device as claimed in claim 1.

14. The metrology device as claimed in claim 13, comprising a scatterometer metrology apparatus, a level sensor or an alignment sensor.

15. A method of optimizing a location of a structurally varied portion along a length of a hollow-core photonic crystal fiber (HC-PCF), such that broadband output radiation generated from the HC-PCF following excitation by input radiation comprises wavelengths in the ultraviolet region, the method comprising:
   determining a location along the length of the HC-PCF where the pump radiation will be spectrally expanded by a modulation instability dominated nonlinear optical process, and
   locating the structurally varied portion downstream of the determined location.

16. A broadband light source device configured for generating a broadband output radiation upon receiving pump radiation, the device comprising:
   a hollow-core photonic crystal fiber (HC-PCF) comprising at least one structurally varied portion having at least one structural parameter of the HC-PCF varied with respect to one or more main portions of the HC-PCF,
   wherein the at least one structurally varied portion comprises at least a certain structurally varied portion located downstream of a position along the length of the HC-PCF where the pump radiation will have been spectrally expanded by a modulation instability dominated nonlinear optical process, and
   wherein the at least one structurally varied portion is configured and located such that the broadband output radiation comprises wavelengths in the ultraviolet spectral region.

17. The device as claimed in claim 16, wherein one or more of the at least one structurally varied portion each comprises at least one reduced cross-sectional width portion comprising an internal core cross-sectional width which is reduced with respect to a main internal core cross-sectional width of the HC-PCF associated with the one or more main portions of the HC-PCF.

18. The device as claimed in claim 16, wherein one or more of the at least one structurally varied portion each comprise different structural dimensions of an inner cladding structure of the HC-PCF with respect to the one or more main portions of the HC-PCF.

19. The device as claimed in claim 16, wherein a beginning of the certain structurally varied portion is located downstream of the position along the length of the HC-PCF where the pump radiation will have been spectrally expanded by a modulation instability dominated nonlinear optical process.

20. The device as claimed in claim 16, wherein the certain structurally varied portion is configured to control a second nonlinear optical process.

* * * * *